United States Patent
Van Toor et al.

(10) Patent No.: US 7,820,841 B2
(45) Date of Patent: Oct. 26, 2010

(54) LOW TRANS-FATTY ACID FAT COMPOSITIONS; LOW-TEMPERATURE HYDROGENATION, E.G., OF EDIBLE OILS

(75) Inventors: N. Hans Van Toor, Zoetermeer (NL); Gijsbertus Johannes Van Rossum, Hoogvliet (NL); Marco B. Kruidenberg, Oostvoorne (NL)

(73) Assignee: Cargill, Incorporated, Wayzata, MN (US)

( * ) Notice: Subject to any disclaimer, the term of this patent is extended or adjusted under 35 U.S.C. 154(b) by 894 days.

(21) Appl. No.: 10/567,727

(22) PCT Filed: Jul. 30, 2004

(86) PCT No.: PCT/US2004/024955
§ 371 (c)(1),
(2), (4) Date: Jan. 3, 2007

(87) PCT Pub. No.: WO2005/012471
PCT Pub. Date: Feb. 10, 2005

(65) Prior Publication Data
US 2007/0179305 A1    Aug. 2, 2007

Related U.S. Application Data

(63) Continuation of application No. 10/750,457, filed on Dec. 31, 2003.

(60) Provisional application No. 60/492,160, filed on Jul. 31, 2003, provisional application No. 60/525,914, filed on Nov. 30, 2003, provisional application No. 60/546,397, filed on Feb. 21, 2004.

(51) Int. Cl.
*C07C 51/36* (2006.01)

(52) U.S. Cl. .......................... 554/141; 554/227; 502/159
(58) Field of Classification Search ................. 554/141, 554/227; 502/159
See application file for complete search history.

(56) References Cited

U.S. PATENT DOCUMENTS

| | | |
|---|---|---|
| 3,856,710 A | 12/1974 | Moulton et al. |
| 4,088,603 A | 5/1978 | Carter et al. |
| 4,134,905 A | 1/1979 | Hasman |
| 4,184,982 A | 1/1980 | Schroeder et al. |

(Continued)

FOREIGN PATENT DOCUMENTS

EP    0 021 528 B1    3/1983

(Continued)

OTHER PUBLICATIONS

Maskaev et al., Khimiya i Tekhnologiya Topliv i Masel, No. 6, pp. 19-20, 1973.*

(Continued)

*Primary Examiner*—Deborah D Carr

(57) ABSTRACT

The present disclosure provides low trans-fatty acid fat compositions, methods of hydrogenating unsaturated feed-stocks (e.g., oils), and hydrogenation catalyst compositions. One exemplary method involves producing a catalyst composition by heating a nickel-based catalyst to a first temperature of at least about 85° C. in the presence of hydrogen and a fat component. An unsaturated feedstock may be contacted with the catalyst composition and hydrogenated by sustaining a hydrogenation reaction at a second temperature of no greater than about 70° C. Some specific implementations of the invention permit the production of partially hydrogenated seed oils with low trans-fatty acid contents.

21 Claims, 1 Drawing Sheet

U.S. PATENT DOCUMENTS

| | | |
|---|---|---|
| 4,188,333 A | 2/1980 | Cahen |
| 4,209,547 A | 6/1980 | Scarpiello et al. |
| 4,213,882 A | 7/1980 | Kranich |
| 4,228,088 A | 10/1980 | Kuiper |
| 4,229,361 A | 10/1980 | Cahen |
| 4,251,672 A | 2/1981 | Carter |
| 4,260,643 A | 4/1981 | Cochran |
| 4,263,225 A | 4/1981 | Carter |
| 4,278,609 A | 7/1981 | Kuiper |
| 4,307,026 A | 12/1981 | Kuiper |
| 4,317,748 A | 3/1982 | Torok |
| 4,326,932 A | 4/1982 | Froling |
| 4,356,197 A | 10/1982 | Devitt |
| 4,385,001 A | 5/1983 | Rosen |
| 4,399,007 A | 8/1983 | Froling |
| 4,424,162 A | 1/1984 | Rosen |
| 4,424,163 A | 1/1984 | Rosen |
| 4,430,350 A | 2/1984 | Tresser |
| 4,479,902 A | 10/1984 | Rosen |
| 4,510,091 A | 4/1985 | Rosen |
| 4,510,092 A | 4/1985 | Rosen |
| 4,519,951 A | 5/1985 | Qualeatti |
| 4,547,319 A | 10/1985 | Qualeatti |
| 4,584,139 A | 4/1986 | Gray |
| 4,590,007 A | 5/1986 | Tucker |
| 4,626,604 A | 12/1986 | Hiles |
| 4,666,635 A | 5/1987 | Klimmek |
| 4,670,416 A | 6/1987 | Klimmek |
| 4,696,911 A * | 9/1987 | Boerma et al. ............. 554/147 |
| 4,725,573 A | 2/1988 | Mesters |
| 4,786,402 A | 11/1988 | Anstock |
| 4,847,016 A | 7/1989 | Gobel |
| 4,871,485 A | 10/1989 | Rivers |
| 4,960,960 A | 10/1990 | Harrison |
| 4,973,430 A | 11/1990 | Rivers |
| 5,087,599 A | 2/1992 | Botman |
| 5,112,792 A | 5/1992 | Lok |
| 5,223,470 A | 6/1993 | Bouwman |
| 5,225,581 A | 7/1993 | Pintauro |
| 5,298,638 A | 3/1994 | Toeneboehn |
| 5,354,877 A | 10/1994 | Behr |
| 5,360,920 A | 11/1994 | Weber |
| 5,399,792 A | 3/1995 | Demmering |
| 5,463,096 A | 10/1995 | Lok |
| 5,470,598 A | 11/1995 | Scavone |
| 5,492,877 A | 2/1996 | Gubitosa |
| 5,498,587 A | 3/1996 | Deckers |
| 5,599,376 A | 2/1997 | Camp |
| 5,674,796 A | 10/1997 | Lee |
| 5,693,835 A | 12/1997 | Konishi |
| 5,734,070 A | 3/1998 | Tacke |
| 5,863,589 A | 1/1999 | Covington |
| 5,885,643 A | 3/1999 | Kodali |
| 5,912,041 A | 6/1999 | Covington |
| 5,962,711 A | 10/1999 | Harrod |
| 5,981,781 A | 11/1999 | Knowlton |
| 6,033,703 A | 3/2000 | Roberts |
| 6,113,976 A | 9/2000 | Chiou |
| 6,129,789 A | 10/2000 | Kawase |
| 6,218,556 B1 | 4/2001 | Pintauro |
| 6,229,032 B1 | 5/2001 | Jacobs |
| 6,265,596 B1 | 7/2001 | Harrod |
| 6,365,558 B2 | 12/2001 | Lal |
| 6,383,992 B1 | 5/2002 | Garmier |
| 6,391,369 B1 | 5/2002 | Kincs |
| 6,420,322 B1 | 7/2002 | Kodali |
| 6,452,029 B1 | 9/2002 | Hillion |
| 6,544,579 B1 | 4/2003 | Landon |
| 2002/0016519 A1 | 2/2002 | Lok |
| 2004/0146626 A1 | 7/2004 | Higgins |
| 2005/0027136 A1 | 2/2005 | Van Toor et al. |

FOREIGN PATENT DOCUMENTS

| | | |
|---|---|---|
| EP | 0021528 | 3/1983 |
| EP | 0 021 527 B1 | 5/1983 |
| EP | 0021527 | 5/1983 |
| EP | 0 114 704 A2 | 8/1984 |
| EP | 0 120 122 A2 | 10/1984 |
| EP | 0 215 563 A2 | 3/1987 |
| EP | 0 230 971 A2 | 8/1987 |
| EP | 0 246 366 A1 | 11/1987 |
| EP | 246366 * | 11/1987 |
| EP | 0 277 230 | 8/1988 |
| EP | 0 291 303 | 11/1988 |
| EP | 0 300 018 A1 | 1/1989 |
| EP | 0 314 044 A2 | 5/1989 |
| EP | 0 389 158 | 9/1990 |
| EP | 0 398 668 | 11/1990 |
| EP | 0 429 995 A2 | 6/1991 |
| EP | 0 472 918 A1 | 3/1992 |
| EP | 0 528 850 A1 | 3/1993 |
| EP | 0 569 110 A1 | 11/1993 |
| EP | 0 572 081 A1 | 12/1993 |
| EP | 0 534 524 A2 | 3/1994 |
| EP | 0 665 287 A2 | 8/1995 |
| EP | 0 674 698 A1 | 10/1995 |
| EP | 0 703 728 B1 | 4/1996 |
| EP | 0 654 074 B1 | 12/1996 |
| EP | 0 745 116 B1 | 12/1996 |
| EP | 0 757 031 A2 | 2/1997 |
| EP | 0 791 041 B1 | 8/1997 |
| EP | 0 921 728 | 6/1999 |
| EP | 0 831 713 B1 | 2/2000 |
| EP | 1 057 887 A1 | 12/2000 |
| EP | 1 154 854 A1 | 11/2001 |
| EP | 0 917 561 B1 | 7/2003 |
| WO | WO-88/00855 A1 | 2/1988 |
| WO | WO-88/05767 | 8/1988 |
| WO | WO-91/17667 A1 | 11/1991 |
| WO | WO-94/03566 A1 | 2/1994 |
| WO | WO-94/11472 A1 | 5/1994 |
| WO | WO-94/15478 A1 | 7/1994 |
| WO | WO-95/00035 A1 | 1/1995 |
| WO | WO-95/00036 A1 | 1/1995 |
| WO | WO-95/22591 | 8/1995 |
| WO | WO-96/01304 A1 | 1/1996 |
| WO | WO-97/43907 A1 | 11/1997 |
| WO | WO-98/54275 A2 | 12/1998 |
| WO | WO-00/47320 A1 | 8/2000 |
| WO | WO-02/00815 A2 | 1/2002 |
| WO | WO-03/059505 A1 | 7/2003 |
| WO | WO-03/353152 A2 | 7/2003 |
| WO | WO-03/080779 A1 | 10/2003 |
| WO | WO 2004/068960 A1 | 8/2004 |
| WO | WO-2004/068960 A1 | 8/2004 |

OTHER PUBLICATIONS

"PRICAT Catalysts for the Hydrogenation of Edible Oils," http://www.synetix.com/edibleoils/applications-edibleoils.htm, 2 pages Jul. 25, 2003.

Takeya, K. et al., "Hydrogenation of Soybean Oil by Loop Reactor Equipped with Venturi Nozzel," J. Jpn. Soc. Food Sci. 42 (4): 237-247 1995.

Takeya, K. et al., "Influence of Nitrogen Gas on Hydrogenation of Corn Oil .2. Novel Method of Edible Oil Hydrogenation," J. Jpn. Soc. Food Sci. 43(4): 417-422 1996.

"PRICAT Catalysts for the Hydrogenation of Edfible Oils," ###http://www.synetix.com/edibleoils/applications-edibleoils.htm, 2 pages Jul. 25, 2003.

Anderson, J.A., et al., "Influence of the Support in the Selectivity of NI Clay Catalysts for Vegetable Oil Hydrogenation," Amer Chemical Soc.,: 2485-2490 Oct. 1993.

Andrade, G.M.S., et al., "A Statistical Evaluation of the Effects of Process Variables During Catalytic Hydrogenation of Passion Fruit (Passiflora edulis) Seed Oil," Braz. J. Chem. Eng., vol. 15, No. 1, ISSN 0104-6632, 12 pages, Mar. 1998.

Balakos, M.W., et al., "Catalyst characteristics and performance in edible oil hydrogenation," Catalysis Today 35 (4): 415-425 Apr. 11, 1997.

Bayer, E., et al., "Selective Hydrogenation of Oleic Acid-Rich Oils in Aqueous-Medium by a PVP-NI-Catalyst," Fett Wissenchaft Technologie-Fat Science Technology, Mar. 1992, pp. 79-82, 94 (3), Konradin Industrieverlag GMBH, Germany.

Behr, A., "Selective Hydrogenation of Multi-Unsaturated Fatty-Acids in the Liquid-Phase," Fett Wissenchaft Technologie-Fat Science Technology, Jan. 1993, pp. 2-11, 95(1), Konradin Industrieverlag GMBH, Germany.

Bernas, A., et al., "Influence of Hydrogen Preactivation on the Linoleic Acid Isomerization Properties of Supported Ruthenium Catalyst," 2003, pp. 3-10, vol. 78, No. 1, Budapest.

Bhering, D. et al., "Preparation of High Loading Silica-Supported Nickel Catalyst: Analysis of the Reductio Step," Applied Catalysis A: General , 2002, 55-64, 234(1).

Bhering, D. et al., "Preparation of High Loading Silica-Supported Nickel Catalyst: Analysis of the Reduction Step," Applied Catalysis A: General, 2002, pp. 55-64, 234 (1).

Brehm, A., et al., "Use of Platinum-Loaded Y-Zeolites as Catalysts for Hydrogenation of Liquid and Low-Melting Fats," Chemie Ingenieur Technik, Dec. 1989, pp. 963-964, vol. 61 (12).

Choo, H.P., et al., "Activity and selectivity of noble metal colloids for the hydrogenation of polyunsaturated soybean oil," J Mol Catal A-Chem 191 (1): 113-121 Jan. 2, 2003.

Choo, H.P., et al., "Hydrogenation of palm olein catalyzed by polymer stabilized Pt colloids," Journal of Molecular Catalysis A: Chemical 165: 127-134 2001.

Chung, C.S. et al., "Catalyst Preparation and Support Effects for Triglyceride Hydrogenation over Supported Nickel," J Chem. Tech. Biotechnol, 1987, pp. 15-30, vol. 38, Great Britain.

Drozdowski, B., et al., "Effect of rapeseed oil hydrogenation conditions on trans isomers formation," Eur. J. Lipid Sci. Technol. 102: 642-645 2000.

Ferreras, J.F., et al., "Influence of the Clay and the Nickel Content in Catalysts for Vegetable Oil Hydrogenation," React. Kinet. Catal. Lett., vol. 53, No. 1: 1-6 1994.

Fillion, B. et al. "Gas-liquid mass-transfer and hydrodynamic parameters in a soybean oil hydrogenation process under industrial conditions," Ind Eng Chem Res 39 (7): 2157-2168 Jul. 2000.

Fillion, B., et al., "Kinetics, Gas-Liquid Mass Transfer, and Modeling of the Soybean Oil Hydrogenation Process," Ind. Eng. Chem. Res.: 697-709 2002.

Furlong, K., "The Low Trans Challenge", Oils and Fats International, Jul. 2004, pp. 30-31.

Gonzales-Marcos, M.P., et al., "Nickel on Silica Systems. Surface Features and Their Relationship with Support, Preparation Procedure and Nickel Content," Appl Catal A-Gen 162 (1-2): 269-280 Nov. 18, 1997.

Gonzalez-Marcos, M.P., et al., Effect of Thermal Treatments on Surface Chemical Distribution and Catalyst Activity in Nickel on Silica Systems, J Mol Catal A-Chem 120 (1-3): 185-196, Jun. 13, 1997.

Gonzalez-Marcos, M.P., et al., "Control of the Product Distribution in the Hydrogenation of Vegetable Oils over Nickel on Silica Catalysts," The Canadian Journal of Chemical Engineering, vol. 76: 927-935 Oct. 1998.

Grau, R. J., et al., "The Cup-and-Cap Reactor: A Device to Eliminate Induction Times in Mechanically Agitated Slurry Reactors Operated with Fine Catalyst Particles," Ing. Eng. Chem. Res., vol. 26, No. 1, 18-22, 1987.

Herrero, J., et al., "Catalytic Behaviour of Rhodium Supported on Palygorskite, Silica and Titania in Oil Hydrogenation," Applied Catalysis A: General, 86: 37-43, 1992.

Hsu, N, et al., "Catalytic Behavior of Palladium in the Hydrogenation of Edible Oils," J Am Oil Chem Soc, 65 (3): 349-356, Mar. 1988.

Ilinitch, O.M., "Nanosize Palladium Loaded Catalytic Membrane: Preparation and Cis-Trans Selectivity in Hydrogenation of Sunflower Oil," Stud Surf Sci Catal 118: 55-61 1998.

Jart, A., "The magnetic field as an additional selectivity parameter in fat hydrogenation," J Am Oil Chem Soc 74 (5): 615-617 May 1997.

Jovanovic, D., et al., "Nickel hydrogenation catalyst for tallow hydrogenation and for the selective hydrogenation of sunflower seed oil and soybean oil," Catal Today 43 (1-2): 21-28 Aug. 13, 1998.

Jovanovic, D., et al., "The influence of the isomerization reactions on the soybean oil hydrogenation process," J Mol Catal A-Chem 159 (2): 353-357, 2000.

Ju, J.W., et al., "Effects of alcohol type and amounts on conjugated linoleic acid formation during catalytic transfer hydrogenation of soybean oil," J Food Sci 68 (6): 1915-1922 Aug. 2003.

Ju, J.W., et al., "Formation of conjugated linoleic acids in soybean oil during hydrogenation with a nickel catalyst as affected by sulfur addition," J Agr Food Chem 51 (10): 3144-3149, May 7, 2003.

Jung, M.O., et al., "CLA Formation in Oils During Hydrogenation Process as Affected by Catalyst Types, Catalyst Contents, Hydrogen Pressure, and Oil Species," JAOCS, vol. 79, No. 5: 501-510 2002.

Jung, M.O., et al., "Effects of Temperature and Agitation Rate on the Formation of Conjugated Linoleic Acids in Soybean Oil during Hydrogenation Process," J. Agric. Food Chem.: 3010-3016 2001.

King, J., et al., "Hydrogenation of Vegetable Oils Using Mixtures of Supercritical Carbon Dioxide and Hydrogen," JAOCS, vol. 78 No. 2 107-113 2001.

Kitayama, Y., et al., "Catalytic Hydrogenation of Linoleic Acid over Platinum-Group Metals Supported on Alumina," JAOCS, vol. 74, No. 5: 525-529 1997.

Koseoglu, S.S., et al., "Recent Advances in Canola Oil Hydrogenations," J Am Oil Chem Soc 67 (1): 39-47 Jan. 1990.

List, G.R., et al., "Hydrogenation of Soybean Oil Triglycerides: Effect of Pressure on Selectivity," JAOCS, vol. 77, No. 3: 311-314 2000.

M.B. Macher, A. Holmqvist, "Hydrogenation of palm oil in near-critical and supercritical propane," Eur J Lipid Sci Tech 103 (2): 81-84 Feb. 2001.

Mangnus G., "Hydrogenation of Oils at Reduced TFA Content", Oils and Fats International, Jul. 2004, pp. 33-35.

Mondal, K., et al., "Mediator-assisted electrochemical hydrogenation of soybean oil," Chemical Engineering Science: 2643-2656 2003.

Naglic, M., et al., "Kinetics of Catalytic Transfer Hydrogenation of some Vegetable Oils," JAOCS, vol. 75, No. 5: 629-633 1998.

Nele, M., et al., "Preparation of high loading silica supported nickel catalyst: simultaneous analysis of the precipitation and aging steps," Appl Catal A-Gen 178 (2): 177-189 Mar. 22, 1999.

Parry, J.D., et al., "The Hydrogenation of Triglycerides Using Supported Alloy Catalysts. I. Silica-Supported Ni-Ag Catalysts," J Chem Technol Biot 50 (1): 81-90 1991.

Parry, J.D., et al., "The Hydrogenation of Triglycerides Using Supported Alloy Catalysts. II. Silica-Supported Pd-Cu Catalysts," J Chem Technol Biot 50 (1): 81-90 1991.

Ravasio, N., et al., "Environmental friendly lubricants through selective hydrogenation of rapeseed oil over supported copper catalysts," Applied Catalysis A: General 233: 1-6 2002.

Santacesaria, E., et al., "Role of mass transfer and kinetics in the hydrogenation of rapeseed oil on a supported palladium catalyst," Applied Catalysts A: General 116: 269-294 1994.

Schoon, N.H., "Is a Low Trans Content Attainable by Conventional Hydrogenation of Vegatable Oils?", Oils-Fats-Lipids, Proceedings of the 21st World Congress of the International Society for Fat Research (ISF), The Hague: 155-158 Oct. 1995.

Simon, P., et al., "A Simplified Horiuti-Polanyi Scheme for the Hydrogenation of Triacylglycerols," JAOCS, vol. 68, No. 2: 74-78 Feb. 1991.

Smidovnik, A., et al., "Catalytic Transfer Hydrogenation of Soybean Oil," JAOCS, vol. 69, No. 5: 405-409 May 1992.

Smidovnik, A., et al., "Kinetics of Catalytic Transfer Hydrogenation of Soybean Oil," JAOCS, vol. 71, No. 5: 507-511 May 1994.

Suh, D.J., et al., "Nickel-alumina composite aerogels as liquid-phase hydrogenation catalysts," J Non-Cryst Solids 285 (1-3): 309-316 Jun. 1, 2001.

Takeya, K. et al., "Hydrogenation of Soybean Oil by Loop Reactor Equiped with Venturi Nozzle," J Jpn Soc Food Sci 42 (4): 237-247 1995.

Takeya, K., et al., "Influence of Nitrogen Gas on Hydrogenation of Corn Oil .2. Novel Method of Edible oil Hydrogeneration," J Jpn Soc Food Sci 43 (4): 417-422 1996.

Takeya, K., et al., "Novel Method of Edible Oil Hydrogenation .1. Influence of Inert-Gases on Hydrogenation of Soybean Oil," J Jpn Soc Food Sci 42 (6): 410-418 1995.

Takeya, K., et al., "Soybean oil hydrogenation using hydrogen storage alloy .3. Novel method of edible oil hydrogenation," J Jpn Soc Food Sci 43 (5): 502-509 1996.

Thomson, A., et al., "Silica-Supported Alloy Catalysts for Triglyceride Hydrogenation: The preparation and Properties fo Pd-Ag and Pd-Ni Systems," J Chem Technol Biot 37 (4): 257-270 1987.

Veldsink, J., "Selective Hydrogenation of Sunflower Seed Oil in a Three-Phase Catalytic Membrane Reactor," JAOCS, vol. 78, No. 5: 443-446 2001.

Veldsink, J.W., et al., "Heterogeneous hydrogenation of vegetable oils: A literature review," Catal Rev 39 (3): 253-318 1997.

Wang, Y.Q., et al., "A natural seed oil rich in omega6 and omega3 fatty acids," ###http://www.unl.ac.uk/ibchn/publication/pns01_wang_02.pdf, 1 page.

Warner, K., et al., "Electrochemical Hydrogenation of Edible Oils in a Solid Polymer Electrolyte Reactor. Sensory and Compositional Characteristics of Low Trans Soybean Oils," JAOCS, vol. 77, No. 10 1113-1117 2000.

Weidong, A., et al., "The Electrochemical Hydrogenation of Edible Oils in a Solid Polymer Electrolyte Reactor. I. Reactor Design and Operation," JAOCS, vol. 75, No. 8: 917-925 1998.

Weidong, A., et al., The Electrochemical Hydrogenation of Edible Oils in a Solid Polymer Electrolyte Reactor. II. Hydrogenation Selectivity Studies, JAOCS, vol. 76, No. 2: 215-222 1999.

Wright, A.J., et al., "Cis selectivity of mixed catalyst systems in canola oil hydrogenation," Food Research International: 797-804 2003.

Yusem, G., et al., "Electrocatalytic hydrogenation of soybean oil in a radial flow-through Raney nickel powder reactor," Journal of Applied Electrochemistry: 989-997 1996.

Yusem, G.J., et al., "The Electrocatalytic Hydrogenation of Soybean Oil," JAOCS, vol. 69, No. 5: 399-404 May 1992.

\* cited by examiner

LOW TRANS-FATTY ACID FAT COMPOSITIONS; LOW-TEMPERATURE HYDROGENATION, E.G., OF EDIBLE OILS

CROSS REFERENCE TO RELATED APPLICATIONS

This is a U.S. national phase application of International Application No. PCT/2004/024955 filed Jul. 30, 2004, which is a continuation-in-part of U.S. application Ser. No. 10/750, 457, entitled "Low Trans-Fatty Acid Fat Compositions; Low-Temperature Hydrogenation, e.g., of Edible Oils" and filed 31 Dec. 2003, and claims the benefit of U.S. Provisional Application Nos. 60/546,397, filed 21 Feb. 2004; 60/525,914, filed 30 Nov. 2003; and 60/492,160, filed 31 Jul. 2003. The teachings of each of these applications are incorporated herein by reference.

TECHNICAL FIELD

The present invention relates generally to hydrogenation processes and fat compositions. The methods and compositions described below have particular utility in connection with hydrogenation of edible oils to form low trans-fatty acid fats that may be used in or as margarine, shortening, or frying fat, for example.

BACKGROUND

Most seed oils and vegetable oils, such as soybean oil, rapeseed oil, corn oil, sunflower oil, palm oil, or linseed oil, contain a variety of saturated and unsaturated fatty acids. The fatty acid profiles of oils commonly vary by source, but typically include a variety of saturated fatty acids, such as palmitic acid (C16:0) and stearic acid (C18:0); some monounsaturated fatty acids such as oleic acid (C18:1) and erucic acid (C22:1); and polyunsaturated fatty acids including linoleic acid (C18:2) and linolenic acid (C18:3). (The Cx:y designation refers to fatty acids wherein x is the number of carbon atoms and y is the number of double bonds.)

Polyunsaturated fatty acids, particularly linolenic acid (C18:3), have been found to lead to unacceptable rancid flavors in oil during baking, frying, etc. High contents of linolenic acid can also render edible oils unstable and easily oxidized during cooking and storage, which compromises the sensory characteristics of foods cooked in such oils. Many food oils are hydrogenated to increase stability by reducing the amount of linolenic acid and increasing saturated and monounsaturated fatty acids. For example, the maximum desirable linolenic acid content for many commercial frying oils is about two weight percent of the total fatty acid content of the oil.

Hydrogenating (mono)unsaturated fatty acids increases the saturated fatty acid content. Unduly high saturated fatty acid content in edible hydrogenated fat products, e.g., food oils, can adversely impact cardiovascular health by raising serum cholesterol levels. As a byproduct of hydrogenation, unsaturated fatty acids can be converted from their natural cis configuration to their trans isomer form. Recent studies have indicated that trans-fatty acids can impact cardiovascular health more negatively than saturated fatty acids do. In part due to this recent research, consumers are focusing more on trans-fatty acid content of edible hydrogenated fat products, with lower trans-fatty acid content being preferred by most consumers.

A variety of hydrogenation catalysts is known in the art. Each catalyst has shortcomings, though. Some particularly active catalysts, such as platinum or palladium, are able to hydrogenate food oils at relatively low temperatures, e.g., room temperature, but they generally are not very selective. As a consequence of unselective hydrogenation, a hardened fat that is solid at room temperature often will be achieved before C18:3 content of rapeseed oil or soybean oil, for example, is reduced to two percent. Consequently, such catalysts are unsuitable for producing a commercial pourable frying oil that is semi-liquid at room temperature.

Nickel-based catalysts are more selective, tending to hydrogenate trienic fatty acids at a higher rate than dienic or monoenic fatty acids. Most commercially available nickel-based hydrogenation catalysts comprise nickel on a relatively inert carrier, such as silica or alumina. The properties of nickel-based catalysts may be adjusted by additions of minor amounts of other metals, such as copper or even minor amounts of platinum or palladium. Commercially available nickel-based catalysts used in hydrogenating food oils, for example, are typically sold with the nickel-based catalysts distributed in a fully hardened fat matrix.

Nickel-based catalysts on inert carriers can be more selective than platinum and palladium, for example, but typically require either high temperatures or electrolysis to drive the hydrogenation reaction. In the absence of electrolysis, nickel-based catalysts typically require temperatures of 100° C. or more to conduct hydrogenation at an acceptable rate, with commercial hydrogenation processes being conducted at 120° C. or higher. Conducting hydrogenation at such high temperatures, however, tends to increase the formation of trans-fatty acids. For example, commercially available hydrogenated semi-liquid frying oils based on rapeseed or soybean oil and having C18:3 levels of 2% or less will typically have at least 15% of the fatty acids in the trans form, with trans-fatty acid contents of 20% or higher being commonplace.

Electrolytic hydrogenation using nickel catalysts can be conducted at relatively low temperatures, e.g., room temperature, but have limited use for commercial production of hydrogenated food oils. In electrolytic applications, the nickel catalyst is typically a monolithic block of nickel that can be electrically connected to a power source to serve as a cathode. An anode is spaced from the nickel cathode. Food oils tend to be fairly good dielectrics and significantly limit electrical conduction between the cathode and the anode. To render the food oils conductive, they typically must be emulsified in a conductive medium (e.g., saline solution or formic acid) or mixed with a solvent (e.g., alcohol or ketones). Adding and subsequently removing such conductive agents drives up the cost of the hydrogenation process and may render the resultant product less desirable as a food oil.

DETAILED DESCRIPTION

A. Overview

Figure 1:
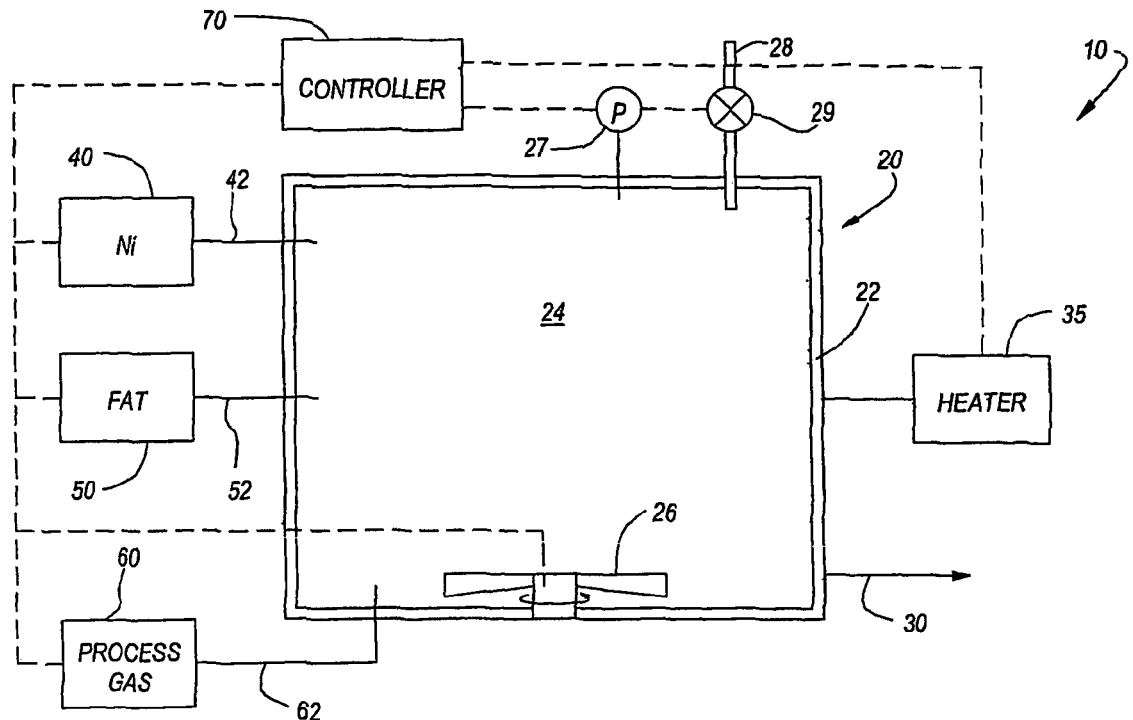
FIG. 1 is a schematic illustration of a catalyst preparation system in accordance with one embodiment of the invention.

Various embodiments of the present invention provide methods for activating nickel-based hydrogenation catalysts; catalyst compositions including activated nickel-based hydrogenation catalysts; methods for hydrogenating an unsaturated feedstock, e.g., an edible oil; and edible hydrogenated fat compositions. The following text discusses aspects of the invention in connection with FIGS. 1 and 2 to provide a thorough understanding of particular embodiments. A person skilled in the art will understand, however, that the invention may have additional embodiments, or that the invention may be practiced without several of the details of the embodiments shown in FIGS. 1 and 2.

One embodiment of the invention provides a method for hydrogenating an unsaturated feedstock. In accordance with this method, a catalyst composition is produced by heating a nickel-based catalyst to a first temperature of at least about 85° C. in the presence of hydrogen and a protective non-gas medium. The unsaturated feedstock may then be contacted with the previously treated catalyst composition and hydrogenated by sustaining a hydrogenation reaction at a second temperature of no greater than about 75° C., preferably no greater than about 70° C. In this embodiment, the feedstock may comprise at least one polyunsaturated hydrocarbon.

Another embodiment of the invention provides a method of hydrogenating an oil having an initial Iodine Value and including an initial fatty acid content, with at least about four percent of the initial fatty acid content comprising C18:3. In accordance with this method, a nickel-based catalyst is dispersed in the oil and hydrogen is delivered to the oil. The oil is hydrogenated at a hydrogenation temperature no greater than about 70° C. for a hydrogenation time to yield a hydrogenated oil having a modified Iodine Value and including a modified fatty acid content. The hydrogenated oil in this embodiment is no more solid than semi-liquid, i.e., is liquid or semi-liquid, at 25° C. An absolute difference between the initial and modified Iodine Values divided by the hydrogenation time defines an average Iodine Value change rate of no less than about 5/hour. No more than about 2.5% of the modified fatty acid content comprises C18:3 and no more than about 6% of the modified fatty acid content comprises trans-fatty acids.

A substantially platinum-free hydrogenation catalyst composition in accordance with another embodiment of the invention includes a protective non-gas medium, e.g., a solid hydrogenated fat matrix, and a nickel-based catalyst dispersed in the protective non-gas medium. The nickel-based catalyst is adapted to sustain, in the presence of hydrogen, a hydrogenation reaction of a dielectric oil comprising polyunsaturated fatty acids at a temperature of about 70° C. or less, e.g., no greater than about 50° C.

The terms "oil" and "fat" as used herein may be considered interchangeable. While a fat usually refers to an oil in a substantially solid form, a solid fat will become an oil when heated to a particular temperature. In the same way substantially all oils will solidify when cooled to a low enough temperature. Therefore, in the context of this specification the terms will be used in a manner to reflect the prevalent state of the material being described. Unless the context dictates a contrary conclusion, this reference to the prevalent state should not be construed as a limitation because a change in temperature or substitution of an oil for a fat or a fat for an oil is always possible.

The term "nickel catalyst" as used herein in refers to a nickel compound or mixture of nickel compounds that can function as a catalyst in the present invention. Such nickel catalysts include but are not limited to Ni and NiO. The nickel catalyst may comprise any one or more nickel containing compounds in proportion. Typically, at least some of the nickel will be present as NiO. In some embodiments, substantially all, or even 100%, of the nickel is present as NiO, as in the case of nickel catalysts that have been calcined in air. In other embodiments, about 30-60% of the weight of the nickel is nickel metal and the balance of the weight of the nickel is contained in NiO.

The term "nickel-based catalyst" as used herein refers to a nickel catalyst alone or a nickel catalyst that has been additionally combined with a support material and/or carrying agent. In one embodiment, the nickel-based catalyst comprises nickel carried on an inert support, e.g., alumina or silica. The nickel may comprise about 10-100 weight percent, e.g., about 50-90 weight percent, of the nickel-based catalyst.

In some embodiments, substantially all of the metal carried on the inert support may comprise nickel. In other embodiments, minor amounts of copper or other metals may be added to control activity, selectivity, or other properties of the catalyst. In select implementations, the nickel-based catalyst may be at least substantially free of platinum, palladium, or ruthenium. Nickel catalysts on inert supports expected to suffice for this purpose are commercially available from Degussa AG of Frankfurt, Germany, among others. In addition, nickel-based catalysts often are stored in a carrier material such as an oil or fat for convenience but also to avoid fouling of the catalyst during storage. The presence or absence of such a carrier, while not critical to the present invention, may be taken into account during the processes of the present invention, as discussed below.

The term "catalyst composition" as used herein refers to a nickel-based catalyst which has been prepared by the present invention and includes a protective non-gas medium. The nature of the protective non-gas medium may be varied depending on the nature of the feedstock to be hydrogenated and other process factors. In some preferred embodiments, this protective non-gas medium comprises an oil or fat component. For this reason, the invention is described below in the context of using an oil or fat component as the protective non-gas medium. It should be understood, though, that not all embodiments of the invention are so-limited.

For ease of understanding, the following discussion is subdivided into three areas of emphasis. The first section discusses aspects of processes for activating hydrogenation catalysts and catalyst compositions in accordance with selected embodiments of the invention. The second section outlines hydrogenation methods in accordance with other aspects of the invention. The third section discusses edible fat compositions in accordance with other embodiments of the invention.

B. Catalyst Preparation And Catalyst Compositions

FIG. 1 schematically illustrates one possible catalyst preparation system 10 useful for forming a catalyst composition in some embodiments of the invention. The catalyst preparation system 10 includes a catalyst preparation vessel 20 having walls 22 defining an interior 24. A nickel-based catalyst may be delivered to the vessel interior 24 from a catalyst supply 40 via a catalyst delivery line 42. A protective non-gas medium, typified in this embodiment as a fat component, may be delivered to the vessel interior 24 from a protective medium supply or fat supply 50 via a delivery line 52. A process gas, e.g., hydrogen gas, may be delivered to the vessel interior 24 from a process gas supply 60 via a process gas delivery line 62.

An agitator 26 in the vessel interior 24 may enhance distribution of process gas and the nickel-based catalyst throughout the fat component during the preparation process. The agitator 26 is schematically illustrated as a rotating set of paddles or blades, but those skilled in the art will recognize that any of a variety of systems may be used to distribute the process gas and the nickel-based catalyst throughout the fat component.

The catalyst preparation system 10 may also include temperature probe 34 and a heater 35 operatively coupled to the catalyst preparation vessel 20 to control the temperature of the material in the vessel interior 24. The same heater 35 or separate heaters (not shown) may also be coupled to one or more of the catalyst supply 40, fat supply 50, and process gas supply 60. The catalyst preparation vessel 20 may also include a pressure control 27 adapted to monitor the pressure within the vessel interior 24 and control a vent valve 29 in a vent line 28 adapted to release excess process gas and other gases (e.g., water vapor generated during the preparation process) from the vessel 20. A vessel outlet 30 may be used to remove the catalyst from the vessel interior 24. As noted below, the outlet 30 may communicate directly with a catalyst composition supply 140 in the hydrogenation system 100 of FIG. 2 (discussed below) or send the catalyst to a storage vessel (not shown) for later use.

The catalyst preparation system 10 also includes a controller 70 adapted to control aspects of the catalyst reaction system 10. The controller 70 may be operatively coupled to one or more of the agitator 26, pressure control 27, vent valve 29, heater 35, catalyst supply 40 or delivery line 42, fat supply 50 or delivery line 52, and process gas supply 60 or delivery line 62. In one embodiment, the controller 70 comprises at least one computer having a programmable processor programmed to control operation of these components to form a catalyst composition.

The nickel-based catalyst in the catalyst supply 40 may comprise any of a variety of conventional nickel-based catalysts. In one useful embodiment, the nickel-based catalyst comprises Ni and NiO on an alumina support.

As noted above, the fat supply 50 delivers a protective non-gas medium. This medium may be any suitable non-gas material that can help protect the nickel-based catalyst from environmental attack (e.g., oxidation) and avoid any unwanted catalyzed reactions. For example, the medium may comprise a liquid medium, e.g., an oil, paraffin oil, a solvent such as an alkane (e.g., hexane), an alcohol (e.g., glycerol), a liquid sugar (e.g., glucose), or a liquid protein. For many applications, this liquid will be substantially non-oxidizing. In other embodiments, the protective non-gas medium may be substantially solid at a temperature of about 25° but may melt, or at least become semi-liquid, at a selected hydrogenation temperature, e.g., 50° C. In addition to fats, protective solid media suitable for select hydrogenation reactions may include one or more of harder paraffins, waxes, solid sugars, and, in some circumstances, polymers having a suitable melting point.

In a preferred embodiment, the protective non-gas medium comprises a fat component. The fat component in the fat supply 50 may be any of a variety of fat compositions, e.g., an edible fat. Although the fat in the fat supply 50 may be substantially saturated, many of the embodiments of the invention will employ an unsaturated fat. As noted below, some embodiments of the invention employ catalyst compositions having relatively low melting points. In such embodiments, the melting point of the catalyst composition produced in the catalyst preparation system 10 may depend in large part on the composition of the fat in the fat supply 50.

Figure 2:
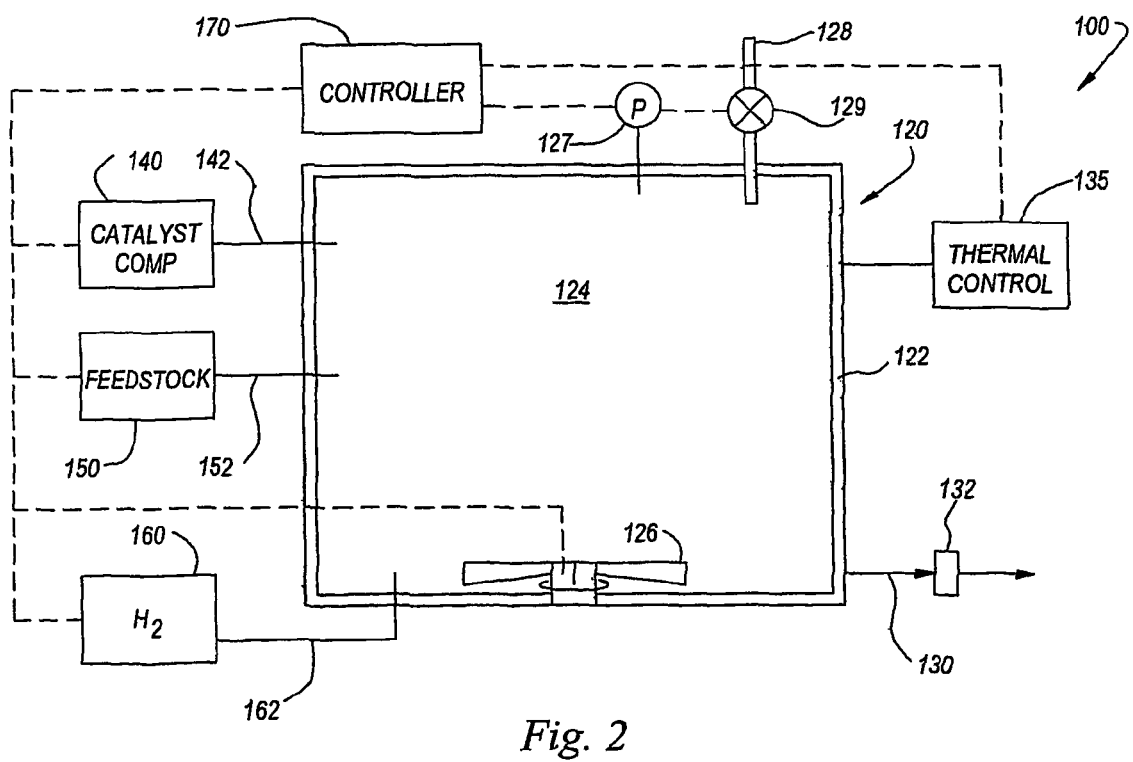
FIG. 2 is a schematic illustration of a hydrogenation system in accordance with another embodiment of the invention.

In some embodiments, the fat in the fat supply 50 comprises seed oil, vegetable oil, marine oil, or an animal fat, or a blend of any two or more of these fats and oils; such fats are collectively referred to herein as "edible fats and oils." Included within the gambit of the identified oils and fats are fractions of those oils or fats, e.g., a fractionated palm oil is considered herein as a seed oil. In certain implementations, the term "edible fats and oils" may also encompass synthesized oils or fats that are similar to such oils, e.g., glycerides such as mono-, di-, and triacylglycerides. Catalyst compositions with relatively low melting points may be formed using; for example, coconut oil, tributyrin, or any other short-chain or medium-chain glycerides in the fat supply 50. In other embodiments, the fat selected for the fat supply 50 may be the same type of fat that is to be hydrogenated in the hydrogenation system 100 (FIG. 2, discussed below). Hence, if the catalyst composition produced in the catalyst preparation system 10 is to be used to hydrogenate soybean oil, the fat component in the fat supply 50 may contain or consist essentially of soybean oil. This avoids the contamination that results from using a fat in the catalyst composition different from the fat being hydrogenated with the catalyst composition.

In the embodiment shown in FIG. 1, there is a separate catalyst supply 40 and fat supply 50. In such an embodiment, the nickel-based catalyst in the catalyst supply 40 may comprise both a nickel-based catalyst as described above and a fat, e.g., a fully hardened seed oil or vegetable oil. Such nickel-based catalyst formulations are commercially available from a variety of sources, including products sold by Johnson Matthey Plc of London, UK under the trade name PRICAT. If the catalyst supply 40 includes sufficient fat to form the desired catalyst composition, the separate fat supply 50 may be omitted, essentially combining the catalyst supply 40 and the fat supply 50 into a single supply. In other embodiments, the fat supply 50 may provide a source of additional fat or any other desired protective non-gas medium; both the fat-containing catalyst formulation in the catalyst supply 40 and additional protective medium from the fat supply 50 may be delivered to the catalyst preparation vessel 20.

The gas in the process gas supply 60 may be any substantially non-oxidizing gas. The process gas may consist of any inert noble gas or substantially inert gas such as nitrogen. In another possible embodiment the process gas may contain or consist essentially of a reducing gas such as hydrogen or ammonia or mixtures of reducing gases. For example, the process gas supply 60 may include a supply of hydrogen gas and a separately controllable supply of nitrogen, ammonia (not shown), or other substantially inert gas. In select embodiments, the gas may consist essentially of hydrogen or comprise a mixture of two or more of hydrogen gas, nitrogen gas, ammonia, and helium gas.

The catalyst preparation system 10 schematically illustrated in FIG. 1 is a batch-type system. It is contemplated, though, that catalyst preparation systems in accordance with other embodiments of the invention may activate catalyst compositions on a continuous basis.

Some embodiments of the invention provide methods for producing an activated catalyst composition. In the following discussion, reference is made to the catalyst preparation system 10 shown schematically in FIG. 1. It should be understood, though, that reference to this particular system is solely for purposes of illustration and that the preparation methods outlined below are not limited to the particular system shown in FIG. 1 or discussed above.

A method in accordance with one embodiment produces a catalyst composition by contacting a nickel-based catalyst with a protective non-gas medium in the presence of a process gas at a preparation temperature. The protective medium may be delivered to the vessel interior 24 from the supply 50 via delivery line 52. In one useful embodiment, the protective medium comprises a fat component, which may be delivered to the vessel interior 24 and heated to the preparation temperature by the heater 35 in the vessel interior 24 before the nickel-based catalyst is added. In other embodiments, the fat component may be pre-heated before it is delivered to the vessel interior 24 and the heater 35 may simply be used to maintain the reactants in the vessel interior 24 at the desired reaction temperature.

The controller 70 may monitor and control the pressure in the vessel interior 24 via the pressure controller 27. In one embodiment, the pressure in the vessel interior is sub-atmospheric or higher, e.g., 1-25 bar with pressures of at least two bar being useful in some configurations. In some embodiments, the pressure in the vessel interior 24 may vary depending on the state of the process. For example, the pressure in the vessel interior 24 may be maintained below atmospheric pressure for a period of time after the fat is introduced to the vessel interior 24 to outgas air and other dissolved gases in the fat. Alternatively, or in addition to such sub-atmospheric outgassing, the fat may be purged, e.g., with nitrogen, hydrogen, or helium, to remove oxygen from the fat.

The nickel-based catalyst may be delivered to the vessel interior 24 via the catalyst delivery line 42. In one embodiment, the nickel-based catalyst is added to a quantity of fat component in the vessel 20 when the fat component is at the desired preparation temperature. In other embodiments, the nickel-based catalyst may be added prior to reaching that temperature. The agitator 26 may intermix the nickel-based catalyst with the fat component, effectively distributing the nickel-based catalyst within the fat component.

The heater 35 may be used to maintain the temperature of the reactants in the vessel interior 24 at the desired preparation temperature. If the fat in the fat supply 50 is unsaturated, contact with the nickel-based catalyst in the presence of hydrogen, for example, from the process gas supply 60 will cause an exothermic hydrogenation reaction. As a result, the reaction may proceed with no additional heat from the heater 35 and the temperature may climb during this hydrogenation process. The preparation temperature is desirably at least about 85° C. In some embodiments the preparation temperature is at least about 95° C. or at least about 100° C. It is anticipated that the reaction rate may be substantially higher at higher temperatures, which may be at least about 150° C., e.g., at least about 200° C. In one exemplary embodiment, the preparation temperature is about 150-200° C. The length of time during which the fat is exposed to hydrogen at the preparation temperature would depend, in part, on the preparation temperature. For example, the preparation process may continue for five minutes or longer, e.g., 5-120 minutes, with longer times typically being employed at lower preparation temperatures.

After heating, the reactants in the vessel interior 24 may be cooled to a lower temperature. For example, the reactants may be cooled to room temperature, e.g., 20-25° C., for storage and future use or, if the reactants are to be directly added to a hydrogenation vessel (124 in FIG. 2), to an intermediate temperature, e.g., 120° C. It appears that cooling these reactants in a reducing atmosphere (e.g., a hydrogen atmosphere) or a nitrogen atmosphere may significantly improve the hydrogenation activity of the catalyst composition. In select embodiments of the invention, the cooling is conducted under a superatmospheric hydrogen pressure, e.g., two bar. It is anticipated that higher hydrogen pressures during cooling may further enhance the hydrogenation activity of the catalyst composition. In one particular embodiment, the reactants are cooled to an intermediate temperature close to room temperature, e.g., 35° C., under a hydrogen atmosphere, then allowed to cool from the intermediate temperature to room temperature in another atmosphere, e.g., air. In one embodiment, the intermediate temperature is less than the melting point of the fat in the catalyst composition.

The preparation process may generate gas, e.g., water vapor. This water vapor can be removed from the vessel 20, e.g., by venting the headspace through vent line 28 or via a condensation system (not shown).

Aspects of select catalyst preparation processes in accordance with the invention are illustrated in the following examples:

Catalyst Preparation Example 1

A first exemplary catalyst composition was formed by adding 40 g of PRICAT 9920 to a round-bottom 250 ml flask. The PRICAT 9920, which is commercially available from Johnson Matthey Plc, is nominally about 22 weight percent total nickel on an alumina support coated with a hardened vegetable fat as a protective medium. The hardened vegetable fat has a melting point (as measured under ISO 6321, "Melting Point in Open Capillary Tubes (Slip Point)") of about 56-69° C. The nickel-based catalyst was heated in the flask at atmospheric pressure with a hydrogen gas flow of approximately one liter per minute to a temperature of about 200° C. while stirring. The contents were stirred at that temperature and hydrogen flow rate for about 90 minutes. The hydrogen pressure was increased to about two bar and the hydrogen flow was stopped. The resulting catalyst composition was cooled to about 20° C., yielding a solid catalyst composition.

Catalyst Composition Preparation Example 2

A second exemplary catalyst composition was formed using substantially the same process as that outlined in Catalyst Preparation Example 1, except that the process was carried out at 95° C. The resulting catalyst composition was cooled to about 20° C., yielding a solid catalyst composition.

Catalyst Composition Preparation Example 3

A third exemplary catalyst composition was formed using substantially the same process as that outlined in Catalyst Preparation Example 1, except that about 40 g of coconut oil was added to the flask with the 40 g sample of PRICAT 9920. The resulting catalyst composition was solid at 20° C. and the fat in the catalyst composition had a melting point of about 50° C.

Catalyst Composition Preparation Example 4

A fourth exemplary catalyst composition was prepared by flowing nitrogen (instead of hydrogen) through a bulk quantity of PRICAT 9920 and neutralized, bleached soybean oil to a pressure of about 2 bar. The temperature was held at about 110° C. for about 120 minutes, with the nitrogen atmosphere in the reaction vessel being maintained by periodically flushing the headspace of the reaction vessel with nitrogen. The final catalyst composition was about 65 weight percent of the PRICAT 9920 nickel-based catalyst, about 22 weight percent soybean oil, and about 13 weight percent PERLITE, a commercially available filter aid.

Once the preparation process is complete, the catalyst composition may be removed from the vessel 20, e.g., via outlet 30. In one embodiment, the catalyst composition may be delivered directly from the vessel 20 to the catalyst composition supply 140 of the hydrogenation system 100, discussed below. In such an embodiment, the catalyst composition may be delivered to the hydrogenation system 100 at an elevated temperature, e.g., at the preparation temperature or, more generally, about 100-200° C. In other embodiments, the catalyst composition may be allowed to cool in a separate system to a lower temperature, e.g., 20-25° C., and stored for an extended period of time. Maintaining a hydrogen atmosphere (or an atmosphere of another reducing gas) during cooling may permit longer storage times without undue loss in activity. Cooling the catalyst composition in a nitrogen or air atmosphere is expected to work well, though.

It has been found, for example, that the low temperature-hydrogenation capabilities of the catalyst composition of some embodiments can be maintained after storage at 20-25° C. for two weeks or longer. It is anticipated that this relatively long shelf life will enable catalyst compositions in accordance with embodiments of the invention to be sold commercially to third parties for use in hydrogenation reactions. Solid catalyst compositions (which may comprise a nickel-based catalyst and a protective solid or at least semi-solid medium) may be stored as a relatively large block or may be divided into smaller particles to facilitate distribution of the catalyst composition in the feedstock to be hydrogenated. Liquid-based catalyst compositions (which may comprise a nickel-based catalyst and a protective liquid or semi-liquid medium) are advantageously stored in a suitable container, e.g., portable drums or jugs.

Other embodiments of the invention provide additional catalyst compositions. In certain embodiments, the catalyst compositions are prepared in accordance with the preparation processes outlined above. In an embodiment of the invention, the catalyst composition is adapted to hydrogenate an unsaturated fatty acid component of a seed oil or vegetable oil, for example, at a temperature below that conventionally understood to be necessary for commercial hydrogenation. Although the nickel-based catalysts may be comprised substantially of a nickel catalyst, catalyst compositions in accordance with preferred embodiments of the invention will include a nickel-based catalyst dispersed in a fat matrix, e.g., a solid or semi-solid fat. For example, the fat matrix may comprise a substantially saturated glyceride, e.g., a hydrogenated fat produced using a long-chain triacylglyceride, seed oil, or vegetable oil as the fat component in the preparation processes outlined above.

The nickel-based catalyst in the catalyst composition is adapted to sustain, in the presence of hydrogen, a hydrogenation reaction of a composition containing polyunsaturated fatty acids at a hydrogenation temperature no greater than about 80° C., e.g., no greater than about 70° C., with 50° C. or less, e.g., 0-50° C., being preferred for many applications. The nickel-based catalyst may be adapted to sustain such hydrogenation at a hydrogenation temperature of about 0-80° C., e.g., about 20-70° C., with some embodiments sustaining hydrogenation at about 30-50° C. and others doing so at about 50-70° C.

The relative proportions of the nickel-based catalyst and the fat component may vary significantly depending on such factors as the nickel content of the nickel-based catalyst and the desired total nickel content of the catalyst composition. In one embodiment, the total nickel content of the catalyst composition is no greater than about 50 weight percent, e.g., 25 weight percent or less, and may advantageously be 22 weight percent of the catalyst composition. (As used herein, the term "total nickel content" refers to the total weight of nickel in the nickel-based catalyst or the catalyst composition. For example, if some of the nickel in the nickel-based catalyst were present as NiO, the total nickel content would include the weight of the nickel in the NiO, as well.) Catalyst compositions having total nickel contents as low as about one weight percent may be employed in some circumstances. Preferably, though, the total nickel content in the catalyst composition is higher than that. Hence, in one embodiment, the total nickel content is about 2-50 weight percent, e.g., between about 2 and about 35 weight percent, with a range of about 2-25 weight percent being useful for many embodiments The preceding discussion focuses on catalyst compositions comprising nickel-based catalysts. The industry-proven selectivity of many nickel-based catalysts is believed to be particularly useful in connection with certain types of feedstocks. It is anticipated, though, that the processes outlined above may enhance the catalytic activity of other hydrogenation catalysts. For example, it is anticipated that the catalytic activity of platinum in hydrogenation reactions may be increased using aspects of the process outlined above. This may enable hydrogenation using lower concentrations of the catalyst, at lower temperatures, or at higher rates than may otherwise be achieved.

Catalyst compositions in accordance with embodiments of the invention can be used advantageously in a variety of hydrogenation reactions. For example, catalyst compositions in accordance with aspects of the invention have particular utility in hydrogenation of seed oils and vegetable oils. As explained below, these catalyst compositions can hydrogenate such oils at temperatures lower than conventionally understood to be necessary for hydrogenation at commercially acceptable rates, which can limit formation of trans-fatty acids.

C. Methods For Hydrogenating Unsaturated Feedstocks, e.g., Edible Oils

Other embodiments of the invention provide systems and methods for hydrogenating unsaturated feedstocks at reduced temperatures. FIG. 2 schematically illustrates a hydrogenation system 100 that may be used in hydrogenating a feedstock in accordance with certain embodiments of the invention. This hydrogenation system 100 includes a hydrogenation vessel 120 including a wall 122 defining a hydrogenation vessel interior 124. A pressure control 127 may be used to monitor pressure within the hydrogenation vessel 120 and control a vent valve 129 in a vent line 128 adapted to release excess hydrogen gas, water vapor, and other gases from the vessel 120. An agitator 126, which may be directly analogous to the agitator 26 of FIG. 1 described above, may be disposed in the hydrogenation vessel interior 124 to mix the reactants within the vessel 120.

The hydrogenated product may be removed from the hydrogenation vessel 120 via an outlet 130. In the catalyst preparation system 10 of FIG. 1, the nickel-based catalyst was intended to remain within the catalyst composition exiting the preparation vessel 20 via the outlet 30. In most intended applications of the hydrogenated product, it may be desirable to remove the nickel-based catalyst from the final hydrogenated product. As is known in the art, a filter 132 may be used to remove the nickel-based catalyst from the hydrogenated product exiting via the outlet 130. In some embodiments, the nickel-based catalyst removed by the filter 132 may be reused, either directly or after further processing. Such further processing may comprise, for example, repeating the preparation process outlined above to reactivate the nickel-based catalyst.

The hydrogenation system 100 also includes a thermal control 135 that may be operatively coupled to the hydrogenation vessel 120. In one embodiment, the thermal control 135 comprises a heat source, e.g., a radiative or conductive heater. In other embodiments, the thermal control 135 may instead be used to cool the contents of the hydrogenation vessel 120, e.g., to prevent the contents of the hydrogenation vessel 120 from exceeding a maximum desired temperature during the exothermic hydrogenation reaction conducted in the vessel 120.

A controller 170 may be used to control operation of the hydrogenation system 100. The controller 170 may be operatively coupled to one or more of the agitator 126, pressure control 127, vent valve 129, thermal control 135, catalyst composition supply 140 (discussed below), feedstock supply 150 (discussed below), and hydrogen supply 160 (also discussed below). The controller 170, like the controller 70 of FIG. 1, may comprise at least one computer having a programmable processor. The programmable processor may be programmed to control operation of the various components of the hydrogenation system 100 to appropriately hydrogenate the feedstock.

A catalyst composition may be delivered from a catalyst composition supply 140 to the hydrogenation vessel interior 124 via a delivery line 142. The catalyst composition in the catalyst composition supply 140 desirably comprises a catalyst composition capable of sustaining a hydrogenation reaction at a suitably low hydrogenation temperature. In many embodiments of the invention, the catalyst composition may comprise an catalyst composition such as that described above, including a nickel-based catalyst and a fat.

An unsaturated feedstock may be delivered to the interior 124 of the hydrogenation vessel 120 via a delivery line 152 from a feedstock supply 150. A wide variety of unsaturated feedstock may be employed to yield different hydrogenated products. The hydrogenation system 100 and the catalyst composition in the supply 140 have particular utility in connection with hydrogenating a feedstock containing edible fats and oils of all types. The edible fats and oils utilized in some embodiments of the invention are liquid oils from seed, vegetable, marine, or animal sources and include, but are not limited to, soybean oil, rapeseed oil, corn oil, high oleic sunflower oil, linseed oil, cottonseed oil, fish oil, and may include animal fats or other fats. As used herein, the term "rapeseed" is used in a generic sense to encompass the seed also referred to in the Americas as canola, but it should not be limited to any specific variety or varieties of rapeseed. The edible fats and oils also include all traditionally bred or genetically modified varieties of the oils listed above. Other embodiments may utilize semi-solid or solid oils or fats from seed, vegetable, marine, or animal sources and include, but are not limited to, palm oil, coconut oil, cocoa butter, marine fats, tallow, and the like. If so desired, the unsaturated fat feedstock can be a blend of seed fat(s), vegetable fat(s), marine fat(s), and/or animal fat(s). In select embodiments, the feedstock comprises a neutralized, bleached seed or vegetable oil, though some applications may use deodorized oils. In addition, the feedstock need not be triglyceride oil and may instead be a mono- or diglyceride, a fractionated or interesterified fat, or even a free or esterified fatty acid.

In one embodiment, the feedstock comprises at least one unsaturated organic component, e.g., an unsaturated (e.g., polyunsaturated) fatty acid or an unsaturated (e.g., polyunsaturated) hydrocarbon. For example, a feedstock comprising soybean oil or rapeseed oil typically would include C18:2 and C18:3 fatty acids. In another embodiment, the feedstock may comprise an unsaturated hydrocarbon. In a further embodiment, the feedstock comprises at least one compound selected from the group consisting of unsaturated aliphatic compounds, unsaturated aromatic compounds, and unsaturated heterocyclic compounds The hydrogenation system 100 also includes a hydrogen supply 160 adapted to deliver hydrogen to the reactants in the hydrogenation vessel 120 via a delivery line 162. In one embodiment, the hydrogen supply 160 comprises hydrogen gas, e.g., a commercial hydrogen gas consisting essentially of hydrogen. In other embodiments, the hydrogen supply 160 may include gases other than hydrogen. These other gases may be provided in a separate gas supply (not shown). As in the case of the process gas supply 60 of FIG. 1, discussed above, the hydrogen supply 160 may, for example, include a separate supply of ammonia or other nitrogen-containing compound, which may enhance selectivity of the hydrogenation reaction. If an edible food oil is to be produced in the hydrogenation system 100, though, it may be advantageous to omit use of ammonia or other nitrogen-containing compounds.

FIG. 2 schematically illustrates a batch-type hydrogenation system 100. In other embodiments of the invention, an alternative hydrogenation system may be employed to hydrogenate any feedstock on a continuous basis. For example, a nickel-based catalyst may be activated in a fixed or fluidized bed and the feedstock may be passed through this bed of activated catalyst.

Other embodiments of the invention provide methods of hydrogenating an unsaturated feedstock. The following discussion of such methods refers to the hydrogenation system 100 of FIG. 2. It should be recognized, however, that methods in accordance with the invention may be conducted using any suitable equipment and the invention is not limited to the specific apparatus shown in FIGS. 1 and 2 and discussed above.

In accordance with an embodiment of the invention, an unsaturated feedstock is contacted with a nickel-based catalyst in the presence of hydrogen. As noted above, the feedstock may comprise a variety of different materials, but in many embodiments of the invention the feedstock may comprise oil containing polyunsaturated fatty acids, e.g., seed oils or vegetable oils. The relative proportions of the feedstock and the catalyst composition added to the hydrogenation vessel 120 will depend, at least in part, on the nickel content of the catalyst composition. In one embodiment, the total nickel content of the combined catalyst composition and feedstock is no greater than 1 weight percent, e.g., 0.05-1 weight percent. In one embodiment found to work well, the total nickel content is about 0.1-0.3 weight percent of the combined catalyst composition and feedstock. The nickel-based catalyst may be dispersed within the feedstock, e.g., by activating the agitator 126. Although it may be possible to utilize catalysts in addition to the nickel-based catalyst from the catalyst composition, it is anticipated that, in most embodiments, the catalyst composition will be substantially the only catalyst source during the hydrogenation of the feedstock.

As noted above, the catalyst composition may comprise a nickel-based catalyst dispersed in a fat matrix, e.g., a fully saturated fat component. If the catalyst composition is at a temperature below the melting point of the fat matrix, the fat matrix will limit interaction between the nickel-based catalyst and the feedstock in the hydrogenation vessel 120. If the catalyst composition is employed above its melting point, though, the melted fat matrix may be mixed with the bulk of the feedstock, allowing the nickel-based catalyst to intimately mix with the feedstock. Accordingly, in one embodiment of the invention, the fat component of the catalyst composition has a melting point that is no higher than the temperature at which hydrogenation is to be conducted in the hydrogenation vessel 120, e.g., no higher than about 60° C. (This melting point may be determined in accordance with ISO 6321, mentioned above.) In some embodiments, the fat matrix may be liquid or semi-liquid at room temperature. For example, the fat matrix may have a solid fat content (SFC, discussed below) of about 20% or less at about 25° C.

In other embodiments, the catalyst composition may include a fat component that has a melting point higher than the intended hydrogenation temperature. To ensure adequate commingling of the nickel-based catalyst and the feedstock, it is preferable that such a catalyst composition be heated to a temperature at least as great as its melting point. This may be advantageously done prior to mixing the catalyst composition with the feedstock. Hence, in one embodiment the catalyst composition may be delivered from the catalyst composition supply 140 to the hydrogenation vessel 120 at a temperature greater than the intended hydrogenation temperature. In such an embodiment, the catalyst composition supply 140 and/or delivery line 142 may include a heater to elevate the temperature of the catalyst composition above the melting point of the fat component. This heated catalyst composition may then be added to a supply of the feedstock in the hydrogenation vessel 120. The feedstock in the hydrogenation vessel 120 may be at a temperature below the intended hydrogenation temperature and the addition of the warmer catalyst composition can elevate the combined temperature to the intended hydrogenation temperature. If further heating is needed to begin the hydrogenation process, the thermal control 135 may heat the contents of the hydrogenation vessel 120.

Alternatively, the catalyst composition may be heated in the hydrogenation vessel 120 to a temperature at least as great as its melting point prior to the addition of the feedstock. In one particular embodiment, the nickel-based catalyst may be activated in the same reaction vessel that is used to carry out the hydrogenation reaction. Hence, in the context of FIGS. 1 and 2, the feedstock supply 150 and the filter 132 may be added to the catalyst preparation system 10 and the feedstock may be added to the catalyst preparation vessel 20 upon completion of the catalyst preparation process. The catalyst composition may be at a temperature substantially higher than the intended hydrogenation temperature, but addition of the feedstock at a temperature below the intended hydrogenation temperature will cool the catalyst composition.

In one embodiment, hydrogen is introduced to the feedstock in the hydrogenation vessel 120 before addition of the catalyst composition. For example, a batch of the feedstock to be hydrogenated may be added to the hydrogenation vessel 120, the pressure control 128 may reduce pressure in the hydrogenation vessel 120, and a flow of hydrogen from the hydrogen supply 160 may be initiated. This will help to de-aerate the feedstock and create a reducing environment in the reaction vessel before the catalyst composition is added to the reaction vessel. De-aerating and introducing hydrogen in this fashion is anticipated to maintain higher hydrogenation activity in the nickel-based catalyst and limit trans-fatty acid formation. This may also help limit the impact of some impurities in the feedstock, some of which (e.g., sulfur) are expected to have a negative impact on the continued catalytic activity of the nickel-based catalyst over time.

During hydrogenation, the pressure control 128 may be used to control the pressure in the hydrogenation vessel 120. As is known in the art, maintaining superatmospheric pressures in the hydrogenation vessel 120 can increase solubility of the hydrogen in an oil feedstock, facilitating hydrogenation. Appropriate pressures may depend, at least in part, on the nature of the feedstock. When hydrogenating food oils, for example, the pressure in the hydrogenation vessel 120 likely will remain less than 100 bars absolute (bar-a), e.g., 50 bar-a or less. In one embodiment, the pressure in the hydrogenation vessel 120 during hydrogenation is about 1-30 bar-a.

A solvent may be added to reduce viscosity of the feedstock, promoting effective introduction and transport of hydrogen-containing gas. That is not believed to be necessary for hydrogenating most edible fats and oils, though, and may be disadvantageous when producing an edible oil for food applications. In one embodiment, therefore, the hydrogenation process is conducted substantially solvent-free.

Suitable hydrogenation temperatures will depend in large part on the nature of the feedstock being hydrogenated. For example, a maximum hydrogenation temperature of about 75° C. will work well for many applications. In one embodiment, however, the hydrogenation temperature is no greater than about 70° C., e.g., no greater than about 60° C. Temperatures of 55° C. or less, e.g., no greater than about 50° C., are advantageous for hydrogenating seed oils, vegetable oils, animal oils, or marine oils to produce a food oil with a low trans-fatty acid content. In one embodiment, the hydrogenation temperature is about 0-50° C., preferably about 20-50° C., with a range of 30-50° C. being suitable for many food oils.

As noted above, hydrogenation is an exothermic reaction. In some embodiments, the hydrogenation is initiated and sustained for a time at a hydrogenation temperature in one of the stated temperature ranges, but may increase beyond that range during hydrogenation. For example, the hydrogenation reaction may be initiated at a temperature not greater than about 55° C., e.g., about 50° C. or less, and the temperature may be allowed to increase, e.g., about 10-30° C., during the course of the hydrogenation reaction. If so desired, the hydrogenation temperature is maintained within one of the above-stated temperature ranges (e.g., no greater than about 70° C.) during the entire hydrogenation process. This may be accomplished, for example, by controlling the flow rate of hydrogen from the hydrogen supply 160 or by cooling the vessel with the thermal control 135.

One measure for characterizing the degree of unsaturation or the prevalence of double bonds in the triglycerides of an oil is the Iodine Value, which is typically determined by the Wijs method (A.O.C.S. Method Cd 1-25). For example, soybean oil typically has an Iodine Value of about 125-135 and rapeseed oil typically has an Iodine Value of about 97-108. Because hydrogenation saturates the double bonds in the triglycerides, a decrease in Iodine Value will serve as a reasonable proxy of a measurement of the degree of hydrogenation. As a corollary, therefore, the rate of change of the Iodine Value for an oil can serve as a proxy for the rate of hydrogenation.

The rate of hydrogenation, and the rate at which the Iodine Value changes, may decrease as the number of double bonds in the oil decreases. An average Iodine Value change rate may be determined by determining the absolute difference between the initial Iodine Value of the oil prior to hydrogenation and the modified Iodine Value of the hydrogenated oil, and dividing that difference by the hydrogenation time. Average Iodine Value change rates of less than about 5/hour correspond to hydrogenation rates that are commercially unattractive for most conventional food oils. Accordingly, in embodiments of the invention employed in manufacturing food oils, for example, the average Iodine Value change rate is desirably no less than about 5/hour. Average Iodine Value change rates of about 6-60/hour are expected to suffice for many commercial food oil hydrogenation processes, with average Iodine Value change rates of about 10-40/hour, e.g., about 20/hour, being typical for many embodiments of the invention.

D. Edible Hydrogenated Fat Compositions

Edible hydrogenated fat compositions in accordance with another embodiment may comprise partially hydrogenated oil, e.g., a partially hydrogenated seed oil, vegetable oil, or marine oil. In select embodiments, these edible fat compositions may be formed by the hydrogenation processes outlined above.

One of the purposes of hydrogenating an oil is to improve its stability, e.g., in air. Reducing the C18:3 content of oils that include C18:3, e.g., soybean oil or rapeseed oil, can significantly improve stability. Some other oils, e.g., sunflower oil, have relatively little C18:3, but may include C18:2, another polyunsaturated fatty acid. A number of industry-accepted tests determine the oxidative stability of an oil by measuring the "induction period" on a RANCIMAT, sold commercially by Metrohm Ltd. of Herisau, Switzerland. One exemplary RANCIMAT test is ISO/DIS 6886.2. Refined soybean and rapeseed oils typically have induction periods at 120° C. (referred to below as "R 120") on the order of about 3.5 hours, with refined sunflower oil having a somewhat shorter induction time of about three hours at the same temperature. Hydrogenating an oil in accordance with embodiments of the invention may significantly increase the induction period of the oil being hydrogenated. In some embodiments of the invention, for example, the hydrogenation process desirably at least doubles the induction period. In one suitable example, the induction period at 120° C. is about ten hours or more, which is more than double the standard 3-3.5 hour induction times for soybean, rapeseed, and sunflower oils, for example.

Measuring the induction period, e.g., the R 120 induction period, of an oil is a direct measurement of at least one aspect of stability. It is possible to approximate the relative oxidation rate, and hence stability, of a edible oil. This approximation will not be very accurate because stability will depend on a variety of other factors, e.g., the presence of any naturally occurring or added antioxidants. As used herein, the relative oxidation rate of an oil may be calculated by multiplying the weight percent of each C18:y component times a weighting factor that is generally correlated to the relative oxidation rate of the particular component. More particularly, the relative oxidation rate (ROR) may be determined in accordance with the following formula:

$$ROR=(0.1 \times C18:1)+(1 \times C18:2)+(2 \times C18:3)$$

wherein C18:1 is the weight percentage of C18:1, C18:2 is the weight percentage of C18:2, and C18:3 is the weight percentage of C18:3. (These percentages are stated as percentages, i.e., the weight fraction times 100. For example, if the oil includes 60 weight percent C18:1, C18:1 in the formula would be 60, and the C18:1 would contribute 6 to the ROR.) Oxidation rates in the above formula are derived from generally accepted rates published in the literature. (See *Bailey's Industrial Oil and Fat Products*, Fifth Edition, Volume 2, e.g., page 72, which is incorporated herein by reference) A higher ROR value generally indicates a higher polyunsaturated fatty acid content and, concomitantly, reduced oil stability. Certain embodiments of the invention comprise an edible oil, e.g., soybean or rapeseed oil, having an ROR value no greater than about 50, e.g., about 45 or less. Alternatively, the ROR value may be determined as suggested by *Bailey's Industrial Oil and Fat Products*. Doing so would necessitate concomitant adjustment of the desired ROR value.

Conventional wisdom dictates that seed oils or vegetable oils such as soybean or rapeseed oils must be hydrogenated at temperatures of 100° C. or higher to achieve commercially acceptable hydrogenation. Conventional wisdom also suggests that the lowest temperature at which a nickel-based catalyst will initiate hydrogenation is about 80° C. and that hydrogenation at 80° C. will take place at a commercially unattractive rate. As noted above, though, hydrogenating seed oils or vegetable oils at temperatures of 100° C. or greater will increase the trans-fatty acid content of the oil to relatively high levels, typically greater than 15% of the fatty acid, with 15-20% being commonplace for semi-liquid hydrogenated frying oils. The market demand for oils with lower trans content is increasing and some industry standards are expected to require trans-fatty acid contents for food oils of no greater than 5%.

Hydrogenating seed oils or vegetable oils with a catalyst composition in accordance with select embodiments of the invention yields partially hydrogenated oils with reduced trans-fatty acid levels. In one embodiment, the feedstock comprises an oil in which 6% or more of the fatty acid content is C18:3. For example, soybean oils typically have C18:3 contents on the order of about 7%, and rapeseed oils often have C18:3 contents of 9% or higher. Hydrogenating such a feedstock with a catalyst composition at a reduced hydrogenation temperature in accordance with an embodiment of the invention, e.g., 50° C. or less, is anticipated to yield a pourable hydrogenated oil that is semi-liquid at typical storage temperatures of about 20° C. or 25° C. in which no more than about 2.5% (preferably no more than about 2%) of the fatty acid content is C18:3 and no more than about 10% (preferably no more than about 6%) of the fatty acid content is trans-fatty acids. In some advantageous embodiments of the invention, the edible fat composition comprises a pourable hydrogenated oil that is no more solid than semi-liquid at about 20-25° C.

One known measure measurement of solid fat content at a particular temperature, method NEN-EN-ISO 8292, employs pulsed nuclear magnetic resonance to measure the solid fat content of the oil at a particular temperature. An oil in one exemplary embodiment is pourable at 25° C. and has a solid fat content measured at 20° C. (SFC 20) of no greater than about 20 weight percent. In another embodiment, the oil is pourable at 25° C. and has a solid fat content measured at 10° C. (SFC 10) of no greater than about 20 weight percent and an SFC 20 of no greater than about 10 weight percent. One further embodiment provides an oil that is pourable at 20° C. and has an SFC 10 of no greater than about 15 weight percent and an SFC 20 of no greater than about 7.5 weight percent. Oils in accordance with other embodiments of the invention may be processed for use as a pumpable shortening or the like having a higher solid fat content than those stated above.

Some commercially available frying oils and shortenings have a trans-fatty acid content of less than 5 weight percent, with some having a trans-fatty acid content of 1 weight percent or less. These products are typically formed by blending and/or interesterification of a fully hydrogenated oil with an unhydrogenated oil. For example, a soybean/sunflower oil blend may be made by fully hydrogenating, i.e., substantially fully saturating all of the fatty acids in, a quantity of soybean oil and blending that with an unhydrogenated sunflower oil and, in some circumstances, an additional quantity of unhydrogenated soybean oil. The fully hydrogenated product will not include double bonds, so it will not include any trans isomers. Hence, the only trans-fatty acid content in such a blend typically would come from the unhydrogenated sunflower oil.

Although fully hydrogenated+liquid ("FH+L") blends (namely, blends in which at least one of the blended fats is fully hydrogenated and at least one of the blended fats is no more solid than semi-liquid) can have relatively low C18:3 and trans-fatty acid content, there are some drawbacks. For example, FH+L blends that are liquid or semi-liquid at 25° C. tend to have relatively low stability at elevated temperatures, e.g., frying temperatures. Whereas a conventional partially hydrogenated soybean oil may have a R 120 induction period of about 8-12 hours, some blends have R 120 induction periods of 7 hours or less, e.g., 4 hours. Many commercial frying applications call for a pourable frying oil with a minimum R 120 induction period of 8 hours or longer, limiting the market acceptance of most blends.

The ROR values for conventional FH+L blends and for blended liquid oils also tend to be higher than ROR values for partially hydrogenated, non-blended oils. The ROR value of any particular partially hydrogenated oil will depend to a large extent on the type of oil being hydrogenated. Initial review suggests that FH+L blends employing about 10 weight percent fully hardened soybean oil and the balance unhydrogenated sunflower and soybean oils, for example, will have ROR values on the order of 60 or more. As noted above, embodiments of the invention have appreciably lower ROR values, e.g., 50 or less, with values no greater than 40, e.g., about 25, being typical of certain embodiments.

Another drawback of conventional FH+L blends is that their solid fat contents do not vary very much with temperature. When manufacturing baked goods, for example, it may be desirable to have low solid fat content at about 35-40° C. to avoid a greasy mouth feel when eaten. Typical semi-liquid FH+L blends may include appreciable solid fats at 40° C., e.g., a FH+L blend with about 10 weight percent fully hydrogenated oil may have a SFC of about 7 weight percent. Embodiments of the present invention, however, may have an SFC 40 value that is about zero. In addition, interesterified blends may also have lower SFC values.

The ratio of unsaturated cis-C18:y fatty acids (i.e., C18:1, C18:2, and C18:3) to the corresponding trans-C18:y fatty acids in a partially hydrogenated oil is an indication of the trans-selectivity of the hydrogenation process. More particularly, a higher ratio of unsaturated cis-C18:y fatty acid content to trans-C18:y fatty acid content suggests a lower likelihood of trans isomerization of an adsorbed carbon-carbon double bond at the catalyst surface. Higher ratios of unsaturated cis-fatty acids to trans-fatty acids, therefore, are preferred in a wide variety of applications, e.g., in many edible oils.

As noted above, trans-fatty acids may impact cardiovascular health more deleteriously than saturated fats. Recent studies (e.g., Mensink, Am. J. Clin. Nutr. 2003; 77: 1146-55) also indicate that C16 (palmitic acid) may have a more negative effect than C18 (stearic acid) on the risk of coronary heart disease. The ratio of saturated C18 fatty acids to trans-fatty acids in a partially hydrogenated oil, therefore, can suggest the desirability of the oil from a health perspective. A higher ratio of C18 to trans-fatty acid can be considered more desirable, at least as long as the C18 content is not unduly high. A number of edible oils, e.g., soybean oil and rapeseed oil, have C18 contents of 6 weight percent or less, e.g., about 4 weight percent or less, prior to hydrogenation. For example, one exemplary deodorized, bleached soybean oil has a C18 content of about 4 weight percent and one exemplary deodorized, bleached rapeseed oil contains about two weight percent C18. Hydrogenation tends to increase C18 levels and conventional processes can yield C18 levels of 4-6 weight percent or higher for products having C18:3 content of about two weight percent. Trans-fatty acid content also increases during hydrogenation, though, and conventional processes yield at least about 15 weight percent trans-fatty acid. As a result, conventional partially hydrogenated oil typically has more trans-fatty acid than C18, yielding a ratio of C18 to trans-fatty acid less than one, most commonly 0.5 or less.

One useful embodiment of the invention provides a pourable, partially hydrogenated edible oil (e.g., soy or rapeseed oil) that is semi-liquid at about 20-25° C.; has a C18:3 content of about 2.5 weight percent or less, e.g., no greater than about 2 weight percent; and includes no more than about 6 weight percent, e.g., no more than about 5 weight percent, of trans-fatty acids. This oil may also have a ratio of unsaturated cis-C18:y fatty acids to trans-C18:y fatty acids (abbreviated below as CFA:TFA) of at least about 10.0, with a ratio of about 12 or greater, e.g., about 15 or more, being desirable. One particular embodiment has a CFA:TFA ratio of at least about 16. Typically, conventional partially hydrogenated edible soybean and rapeseed oils having similar rheology and C18:3 content will have CFA:TFA ratios of less than 10, with some being less than 3. As noted previously, FH+L blends tend to be less stable than partially hydrogenated oils. Very high CFA:TFA ratios are commonly associated with hardened blends, which typically have CFA:TFA ratios of at least about 100. Hence, in select embodiments the CFA:TFA ratio is no greater than about 50, e.g., about 25 or less.

Another embodiment of the invention provides a pourable, partially hydrogenated edible oil that is semi-liquid at about 20-25° C. and has a C18:3 content of about 2.5 weight percent or less, e.g., no greater than about 2 weight percent, and includes no more than about 6 weight percent, e.g., no more than about 5 weight percent, of trans-fatty acids. This oil also has a ratio of saturated C18 to trans-C18:y fatty acid (abbreviated below as C18:TFA) of greater than one, e.g., at least about 1.2. In some embodiments of the invention, the C18:TFA ratio is at least about 1.5, e.g., 2.0 or greater. Some particular embodiments have a C18:TFA ratio of 3 or higher. This is in contrast to conventionally hydrogenated soybean and rapeseed oils, which typically have a CFA:TFA ratio of less than 0.5, with ratios on the order of about 0.3 or less being commonplace. For example, one conventionally hydrogenated soybean oil had a CFA:TFA ratio of about 0.25. The same ratio tends to be lower for conventional partially hydrogenated rapeseed oils, with CFA:TFA ratios typically below 0.25; one such oil had a CFA:TFA ratio of about 0.17. Although other oils may be used, some particularly useful implementations of this embodiment comprise partially hydrogenated soybean oil, partially hydrogenated rapeseed oil, or a partially hydrogenated blend of soybean and rapeseed oils.

FH+L blends commonly have C18:TFA ratios of around 15-30. Such blends are generally considered less stable than partially hydrogenated oils. Hence, in select embodiments the C18:TFA ratio is no greater than about 5, with C18:TFA ratios of about 3 or less being useful for a number of applications.

In certain embodiments, a pourable, partially hydrogenated oil may include CFA:TFA and C18:TFA ratios in accordance with both of the preceding embodiments. As in the two preceding embodiments, this oil may also be semi-liquid at about 20-25° C. and have a C18:3 content of about 2.5 weight percent or less, e.g., no greater than about 2 weight percent, and include no more than about 6 weight percent, e.g., no more than about 5 weight percent, of trans-fatty acids.

The composition of partially hydrogenated oil will depend to a significant extent on the nature of the oil being hydrogenated. The following will summarize some exemplary embodiments of the invention using specific starting oils. In each of these particular embodiments, the partially hydrogenated oil is pourable and may be semi-liquid at about 20-25° C.

Soybean Oil: The partially hydrogenated oil in one exemplary embodiment of the invention comprises a partially hydrogenated soybean oil containing no more than about 2.5 weight percent, e.g., no more than about 2.0 weight percent, of C18:3 and no more than about 6 weight percent, preferably no more than about 5 weight percent, of trans-fatty acids. In one implementation of this embodiment, the CFA:TFA ratio is at least about 12, e.g., 14 or higher. In select implementations, this ratio is at least about 15. If so desired, the CFA:TFA ratio may also be no greater than about 50, e.g., about 25 or less. In another implementation, the C18:TFA ratio is at least about 1.2, e.g., at least about 1.5, with select embodiments having a C18:TFA ratio of 2.0 or greater, e.g., about 2.5 or greater. If so desired, the C18:TFA ratio may also be no greater than about 6, e.g., about 3 or less. Embodiments having a R 120 induction period of at least about 8 hours and/or a ROR value of about 40 or less may be particularly utile, e.g., as a frying oil.

Rapeseed Oil: Another exemplary embodiment of the invention provides a partially hydrogenated rapeseed oil containing no more than about 2.5 weight percent, e.g., no more than about 2.0 weight percent, of C18:3 and no more than about 6 weight percent, preferably no more than about 5 weight percent, of trans-fatty acids. In one implementation of this embodiment, the CFA:TFA ratio is at least about 6, e.g., 9 or higher. In select implementations, this ratio is at least about 10, with CFA:TFA ratios of 15 or higher deemed particularly useful. If so desired, the CFA:TFA ratio may also be no greater than about 50, e.g., about 25 or less. In another implementation, the C18:TFA ratio is at least about 1.2, e.g., at least about 1.5, with select embodiments having a C18:TFA ratio of 2.0 or greater, e.g., 3.0 or greater. If so desired, the C18:TFA ratio may also be no greater than about 6, e.g., about 3 or less. Embodiments having a R 120 induction period of at least about 10 hours and/or a ROR value of about 30 or less may be particularly utile, e.g., as a frying oil.

Sunflower Oil: Partially hydrogenated sunflower oil in accordance with some embodiments of the invention has fatty acid profiles that depend on whether the oil is a "conventional" or "high-oleic" variety. As used herein, a conventional sunflower oil has a C18:1 (oleic acid) content less than 77 weight percent prior to hydrogenation; high-oleic sunflower oil has a C18:1 content of at least about 77 weight percent prior to hydrogenation. Pourable partially hydrogenated oil made from conventional sunflower oil may have a CFA:TFA ratio of at least about 15, e.g., about 18 or higher, and a C18:TFA ratio of at least about 1.2, desirably at least about 1.5, e.g., about 2.0 or higher. If so desired, the CFA:TFA ratio may also be no greater than about 75, e.g., about 50 or less. Pourable partially hydrogenated oil made from high-oleic sunflower oil may have a CFA:TFA ratio of at least about 25, e.g., about 40 or higher, and a C18:TFA ratio of at least about 1.5, e.g., about 2.0 or higher, with C18:TFA ratios of at least about 3.0 being useful in many applications. If so desired, the C18:TFA ratio may also be no greater than about 6, e.g., about 7 or less. In one useful embodiment, a conventional sunflower oil (e.g., no more than about 60 weight percent oleic acid) has a R 120 induction period of at least about 8 hours and/or a ROR value of about 55 or less.

Palmolein: A partially hydrogenated, semi-liquid palmolein in other embodiments of the invention contains no more than about 7 weight percent, e.g., no more than about 5 weight percent, of C18:2 and no more than about 6 weight percent, preferably no more than about 5 weight percent, of trans-fatty acids. In one implementation, the CFA:TFA ratio is at least about 6, e.g., 9 or higher, with some palmolein products of the invention having a CFA:TFA ratio of about 12 or higher. If so desired, the CFA:TFA ratio may also be no greater than about 40, e.g., about 20 or less. The C18:TFA ratio of such a palmolein product may be greater than about 1.5, desirably at least about 2.0, e.g., about 2.5 or higher. If so desired, the C18:TFA ratio may also be no greater than about 6, e.g., about 3 or less. Embodiments having a R 120 induction period of at least about 8 hours and/or a ROR value of about 10 or less may be particularly utile, e.g., as a frying oil.

Corn Oil: Still another embodiment of the invention provides a partially hydrogenated corn oil containing no more than about 50 weight percent, e.g., about 45 weight percent or less, of C18:2 and no more than about 6 weight percent, preferably no more than about 5 weight percent, of trans-fatty acids. In one implementation of this embodiment, the CFA:TFA ratio is at least about 10, e.g., 15 or higher. In select implementations, this ratio is at least about 18, with CFA:TFA ratios of 20 or higher deemed particularly useful. If so desired, the CFA:TFA ratio may also be no greater than about 50, e.g., about 25 or less. In another implementation, the C18:TFA ratio is at least about 0.7, e.g., at least about 1.0, with select embodiments having a C18:TFA ratio of 1.5 or greater. If so desired, the C18:TFA ratio may also be no greater than about 10, e.g., about 6 or less. Embodiments having a R 120 induction period of at least about 8 hours and/or a ROR value of about 50 or less may be particularly utile, e.g., as a frying oil.

The following examples illustrate aspects of select feedstock hydrogenation processes and edible hydrogenated fat compositions in the context of hydrogenating fully refined seed oils:

Hydrogenation Example A—Rapeseed Oil

About 3500 g of refined rapeseed oil was heated to about 40° C. in a 5-liter autoclave. The oil was flushed with hydrogen gas to help remove any air or oxygen dissolved in the oil. The first exemplary catalyst composition discussed above in Catalyst Preparation Example 1 was heated to about 120° C. to melt the hardened vegetable fat. About 35 g of this heated catalyst composition was added and thoroughly mixed to the rapeseed oil in the autoclave. While stirring with a hollow shaft agitator at a speed of about 1000 rpm, a flow of hydrogen gas through the oil was established and the pressure in the autoclave was increased to about 10-15 bar. The temperature was maintained at about 40° C. for about 160 minutes. Table A identifies aspects of the fatty acid profile of the oil prior to hydrogenation (T=0 min.) and after hydrogenation (T=160 min.)

TABLE A

| Component | wt. % at T = 0 min. | wt. % at T = 160 min. |
|---|---|---|
| C18 | 1.8 | 12.4 |
| C18:1 | 61.3 | 63.7 |
| (cis) | | 60.3 |
| (trans) | | 3.4 |
| C18:2 | 19.8 | 13.6 |
| (cis) | | 11.7 |
| (trans) | | 1.9 |
| C18:3 | 9.0 | 2.0 |
| (cis) | | 1.3 |
| (trans) | | 0.7 |
| Total trans-C18:y fatty acids (TFA) | 1.0 | 6.0 |
| Total cis-C18:y fatty acids (CFA) | | 73.3 |

TABLE A-continued

| Component | wt. % at T = 0 min. | wt. % at T = 160 min. |
|---|---|---|
| CFA:TFA | | 12.2 |
| C18:TFA | | 2.1 |

The solid fat content of the hydrogenated oil was determined at 10° C. and at 20° C. by nuclear magnetic resonance. The SFC 10 was about 13 weight percent and the SFC 20 was about 6 weight percent.

This hydrogenation process yielded a semi-liquid hydrogenated rapeseed oil that is pourable at room temperature and has a total C18:3 content of about 2 weight percent and a trans-fatty acid content of only about 6 weight percent. This is substantially less than half the typical 15-20 weight percent trans-fatty acid obtained in conventional hydrogenation processes carried out at 100° C. or more. The CFA:TFA ratio is over 12, suggesting a more selective hydrogenation process, and the C18:TFA ratio is over 2, suggesting that the oil may be more healthful than conventionally hydrogenated rapeseed oil.

Hydrogenation Example B—Rapeseed Oil

A second sample of the same refined rapeseed oil was hydrogenated in a process directly analogous to the process outlined in the previous example. Instead of being hydrogenated at 40° C. for 160 minutes, though, this sample was hydrogenated at 30° C. for about 460 minutes while mixing with the agitator at a speed of about 1300 rpm. Table B identifies aspects of the fatty acid profile of the oil prior to and after hydrogenation.

TABLE B

| Component | wt. % at T = 0 min. | wt. % at T = 460 min. |
|---|---|---|
| C18 | 1.8 | 16.3 |
| C18:1 | 61.3 | 60.2 |
| (cis) | | 58.2 |
| (trans) | | 2.0 |
| C18:2 | 19.8 | 12.9 |
| (cis) | | 11.6 |
| (trans) | | 1.3 |
| C18:3 | 9.0 | 2.0 |
| (cis) | | 1.4 |
| (trans) | | 0.6 |
| Total trans-C18:y fatty acids | 1.0 | 3.9 |
| Total cis-C18:y fatty acids | | 71.2 |
| CFA:TFA | | 18.3 |
| C18:TFA | | 4.2 |

The SFC 10 was about 21 weight percent of the hydrogenated oil and the SFC 20 was about 11 weight percent of the oil. As with the preceding example, the resultant semi-liquid hydrogenated oil is pourable at room temperature, has a total C18:3 content of 2 weight percent, has a CFA:TFA ratio greater than 10 (actually, this ratio exceeds 18 in this example), and has a C18:TFA ratio of greater than 2.0 (over 4 in this case). In this second example, the trans-fatty acid content was only 3.9 percent. While this is superior to Hydrogenation Example A, the 460-minute hydrogenation time may prove unduly expensive for low-cost frying oils, margarines, bakery fats, or similar applications.

Hydrogenation Example C—Soybean Oil

Soybean oil was hydrogenated in a process directly analogous to the process outlined above for the rapeseed oil of Hydrogenation Example A. Table C identifies aspects of the fatty acid profile of the soybean oil prior to hydrogenation and after hydrogenation at 100 minutes (instead of 160 minutes employed in Hydrogenation Example A).

TABLE C

| Component | wt. % at T = 0 min. | wt. % at T = 100 min. |
|---|---|---|
| C18 | 3.2 | 9.3 |
| C18:1 | 25.6 | 41.7 |
| (cis) | | 37.1 |
| (trans) | | 4.6 |
| C18:2 | 52.0 | 34.2 |
| (cis) | | 31.5 |
| (trans) | | 2.7 |
| C18:3 | 6.5 | 1.8 |
| (cis) | | 1.3 |
| (trans) | | 0.5 |
| Total trans-C18:y fatty acids | 0.9 | 7.8 |
| Total cis-C18:y fatty acids | | 69.9 |
| CFA:TFA | | 9.0 |
| C18:TFA | | 1.2 |

The hydrogenated soybean oil had an SFC 10 of about 11 weight percent and an SFC 20 of about 4 weight percent. With a C18:3 content of less than 2 weight percent, this pourable semi-liquid hydrogenated oil is expected to be stable for use as a frying oil, for example. Even so, this oil has a trans-fatty acid content of about 7.8 weight percent, less than half of the 15-20 weight percent typical for most conventional partially hydrogenated oils.

Hydrogenation Example D—Rapeseed Oil

About 3500 g of the same refined rapeseed oil employed in Hydrogenation Example A was heated to about 40° C. in a 5-liter autoclave and flushed with hydrogen gas as outlined above. Instead of using 35 g of the first exemplary catalyst composition at 120° C., though, about 70 g of the third exemplary catalyst composition (Catalyst Composition Preparation Example 3) was added as a solid at about 20° C. to the 40° C. oil and mixed with an agitator at about 1300 rpm. Hydrogen gas was flowed through the oil/catalyst combination and the pressure in the autoclave was increased to about 20-25 bar. The oil and catalyst was mixed at about 40° C. for about 133 minutes. Table D identifies aspects of the fatty acid profile of the rapeseed oil prior to and after the hydrogenation.

TABLE D

| Component | wt. % at T = 0 min. | wt. % at T = 133 min. |
|---|---|---|
| C18 | 1.8 | 15.9 |
| C18:1 | 61.3 | 61.1 |
| (cis) | | 58.8 |
| (trans) | | 2.3 |
| C18:2 | 19.8 | 12.8 |
| (cis) | | 11.5 |
| (trans) | | 1.3 |
| C18:3 | 9.0 | 1.9 |
| (cis) | | 1.3 |
| (trans) | | 0.6 |

TABLE D-continued

| Component | wt. % at T = 0 min. | wt. % at T = 133 min. |
|---|---|---|
| Total trans-C18:y fatty acids | 1.0 | 4.2 |
| Total cis-C18:y fatty acids | | 71.6 |
| CFA:TFA | | 17.0 |
| C18:TFA | | 3.8 |

The hydrogenated rapeseed oil had an SFC 10 of about 17 weight percent and an SFC 20 of about 8 weight percent. Hence, a pourable semi-liquid hydrogenated oil with a C18:3 content under 2 weight percent was produced in a little over two hours with a trans-fatty acid content of only 4.2 weight percent and a ratio of cis-fatty acids to trans-fatty acids of about 17. Even though the total nickel content of the catalyst composition/oil in the autoclave was about the same as in Hydrogenation Example A (the total nickel content of the second catalyst composition is about half that of the first catalyst composition), a hydrogenated oil with a lower trans-fatty acid content was achieved in slightly less time.

Hydrogenation Example E—Rapeseed Oil

A second sample of rapeseed oil was hydrogenated in substantially the same manner as that outlined above in Hydrogenation Example D, except that only 56 g, instead of 70 g, of the third exemplary catalyst composition was added to the oil. Table E identifies aspects of the fatty acid profile of the oil prior to and after hydrogenation.

TABLE E

| Component | wt. % at T = 0 min. | wt. % at T = 131 min. |
|---|---|---|
| C18 | 1.8 | 9.6 |
| C18:1 | 61.3 | 64.7 |
| (cis) | | 61.2 |
| (trans) | | 3.5 |
| C18:2 | 19.8 | 15.1 |
| (cis) | | 13.2 |
| (trans) | | 1.9 |
| C18:3 | 9.0 | 2.2 |
| (cis) | | 1.4 |
| (trans) | | 0.8 |
| Total trans-C18:y fatty acids | 1.0 | 6.2 |
| Total cis-C18:y fatty acids | | 75.8 |
| CFA:TFA | | 12.2 |
| C18:TFA | | 1.6 |

The SFC 10 of the hydrogenated oil was about 8 weight percent and the SFC 20 was about 3 weight percent. Even with this reduced catalyst loading, a pourable semi-liquid hydrogenated rapeseed oil with a C18:3 content of just over 2 weight percent was produced in a little over two hours with a trans-fatty acid content well under half that typically achieved using conventional hydrogenation processes. This particular oil also has a CFA:TFA ratio of in excess of 12, and a C18:TFA ratio of greater than 1.5.

Hydrogenation Example F—Rapeseed Oil

About 10 g of the refined rapeseed oil of the preceding examples was added to a 100-ml flask and about 0.4 g of the third exemplary catalyst composition was added to the flask. The flask was flushed with hydrogen gas. The hydrogen gas pressure was raised to about 1 bar-A, the temperature was increased to about 40° C., and the magnetic stirrer was rotated at about 600 rpm. A sample was removed from the flask about 66 minutes after the catalyst was first added to the flask. As identified in Table F, this test, which used more catalyst than the preceding examples, yielded a hydrogenated oil with a C18:3 content of only 1.4 weight percent and a trans-fatty acid content of 8 weight percent, less than half of that typical for conventional hydrogenated oils, in little over an hour.

TABLE F

| Component | wt. % at T = 0 min. | wt. % at T = 66 min. |
|---|---|---|
| C18 | 1.8 | 6.8 |
| C18:1 | 61.3 | 70.6 |
| (cis) | | 65.4 |
| (trans) | | 5.2 |
| C18:2 | 19.8 | 12.2 |
| (cis) | | 10.0 |
| (trans) | | 2.2 |
| C18:3 | 9.0 | 1.4 |
| (cis) | | 0.8 |
| (trans) | | 0.6 |
| Total trans-C18:y fatty acids | 1.0 | 8.0 |
| Total cis-C18:y fatty acids | | 76.2 |
| CFA:TFA | | 9.5 |
| C18:TFA | | 0.9 |

Hydrogenation Example G—Rapeseed Oil

About 2700 g of the same refined rapeseed oil identified above was added to a 5-liter autoclave, heated to 30° C., and flushed with hydrogen as identified above. About 30 g of the first exemplary catalyst composition mentioned above was mixed with about 300 g of the same refined rapeseed oil in a separate container and heated under nitrogen to about 90° C. and mixed to disperse the catalyst in the additional rapeseed oil. The resultant slurry was mixed with the 2700 g of rapeseed oil in the autoclave. The temperature was maintained at about 30° C. with an agitator speed of about 1300 rpm for about 205 minutes at 10-15 bar. Table G lists aspects of the fatty acid profile of the rapeseed oil prior to and after hydrogenation.

TABLE G

| Component | wt. % at T = 0 min. | wt. % at T = 205 min. |
|---|---|---|
| C18 | 1.8 | 15.4 |
| C18:1 | 61.3 | 60.5 |
| (cis) | | 58.6 |
| (trans) | | 1.9 |
| C18:2 | 19.8 | 13.0 |
| (cis) | | 11.6 |
| (trans) | | 1.4 |
| C18:3 | 9.0 | 1.8 |
| (cis) | | 1.2 |
| (trans) | | 0.6 |
| Total trans-C18:y fatty acids | 1.0 | 3.9 |
| Total cis-C18:y fatty acids | | 71.4 |
| CFA:TFA | | 18.3 |
| C18:TFA | | 4.0 |

The SFC 10 for the hydrogenated oil was about 16 weight percent and the SFC 20 measurement was about 8 weight percent. This resultant hydrogenated oil compares very favorably with conventionally hydrogenated rapeseed oil, having a C18:3 content of only 1.8 percent and a remarkably low trans-fatty acid content of 3.9 weight percent with a hydrogenation time of a little over three hours. The CFA:TFA ratio is over 18, reflecting an advantageous hydrogenation process, and the C18:TFA ratio is about 4, also suggesting that the oil will appeal to more health-conscious consumers.

Hydrogenation Example H—Soybean Oil

About 15 metric tons of neutralized, bleached soybean oil was charged into a commercial hydrogenation reactor, heated to 50° C., and flushed with hydrogen. The fourth exemplary catalyst composition mentioned above was mixed with the soybean oil to form a slurry having about 9 kg of catalyst composition per metric ton of soybean oil. The slurry was hydrogenated for about 150 minutes at 6.5 bar. Table H lists aspects of the fatty acid profile of the soybean oil prior to and after hydrogenation. For purposes of comparison, the last column of Table H lists a typical fatty acid profile for a soybean oil that has been conventionally hydrogenated at about 180° C.

TABLE H

| Component | wt. % at T = 0 min. | wt. % at T = 205 min. | Conventional Hydrogenation |
|---|---|---|---|
| C18 | 3.7 | 9.1 | 5 |
| C18:1 | 23.5 | 39.2 | 55 |
| (cis) | | 36.7 | 37 |
| (trans) | | 2.5 | 18 |
| C18:2 | 53.2 | 36.4 | 27 |
| (cis) | | 34.4 | 22 |
| (trans) | | 2.0 | 5 |
| C18:3 | 6.6 | 2.2 | 1.5 |
| (cis) | | 1.8 | 1 |
| (trans) | | 0.4 | 0.5 |
| Total trans-C18:y fatty acids | 1.0 | 4.9 | 23 |
| Total cis-C18:y fatty acids | | 72.9 | 60 |
| CFA:TFA | | 14.9 | 2.6 |
| C18:TFA | | 1.9 | 0.22 |

The resultant hydrogenated oil was pourable and semi-liquid at about 25° C. As highlighted by the data in Table H, this oil compares very favorably with conventionally hydrogenated soybean oil. The exemplary low-temperature-processed oil has a C18:3 content of only 2.2 percent and a trans-fatty acid content of only 4.9 weight percent (instead of 23 weight percent for the typical oil) when hydrogenated for about two-and-a-half hours. The CFA:TFA ratio is over 14 (cf. the conventional value of 2.6), reflecting an advantageous hydrogenation process, and the C18:TFA ratio is almost two (an order of magnitude higher than the conventional oil).

Hydrogenation Example I—Rapeseed Oil

About 15 metric tons of refined rapeseed oil was charged into the same commercial hydrogenation reactor used in Hydrogenation Example H. The rapeseed oil was heated to about 45° C. and flushed with hydrogen. The rapeseed oil and about 120 kg of the fourth exemplary catalyst composition mentioned previously were mixed and the resultant slurry was hydrogenated for about 50 minutes at a hydrogen gas flow rate of about 600 NM³/hr and a pressure of about 20 bar. The temperature increased over the course of the hydrogenation process from about 45° C. to about 70° C. Aspects of the fatty acid profile of the resultant rapeseed oil are listed in Table I. Typical data for a conventionally hydrogenated rapeseed oil are also included in Table I for purposes of comparison.

TABLE I

| Component | wt. % at T = 50 min. | Conventional Hydrogenation |
|---|---|---|
| C18 | 10.7 | 6 |
| C18:1 | 66.8 | 71 |
| (cis) | 64.3 | 62 |
| (trans) | 2.5 | 9 |
| C18:2 | 12.6 | 13 |
| (cis) | 10.9 | 9 |
| (trans) | 1.7 | 4 |
| C18:3 | 2.0 | 1.5 |
| (cis) | 1.3 | 1 |
| (trans) | 0.7 | 0.5 |
| Total trans-C18:y fatty acids | 4.9 | 13.5 |
| Total cis-C18:y fatty acids | 76.5 | 72 |
| CFA:TFA | 15.6 | 5.3 |
| C18:TFA | 2.2 | 0.44 |

The partially hydrogenated rapeseed oil was pourable and semi-liquid at about 25° C. This example demonstrates the ability of at least one embodiment of the invention to yield a quality oil (in this case, 2 weight percent C18:3, less than 5 weight percent trans-C18:y, a CFA:TFA ratio of over 15, and a C18:TFA ratio over 2) in a very commercially attractive time frame. In this particular example, the Iodine Value of the oil changed by more than 30 over the course of the 50-minute hydrogenation, yielding an iodine value change rate of about 40/hr. Table I further highlights the difference between this exemplary hydrogenated oil and a typical, conventionally hydrogenated rapeseed oil. The conventional product has a trans content that is more than 2.5 times that of the exemplary oil of this embodiment and CFA:TFA and C18:TFA ratios of 5.3 and 0.44, respectively, which are much lower than those of the exemplary oil.

Hydrogenation Example J—Conventional Sunflower Oil

Each of two samples of refined sunflower oil was charged into an autoclave, heated to 40° C., and flushed with hydrogen. About 0.2 weight percent of commercial PRICAT 9920 was added in the first autoclave; about one weight percent of the fourth exemplary catalyst composition mentioned above was added to the other autoclave. The contents of the first autoclave were mixed to form a slurry and treated at about 120° C. in a fairly conventional hydrogenation process at about 180° C. for about five minutes at about one bar-a. The contents of the second autoclave were mixed to form a slurry and hydrogenated for about 100 minutes at a temperature of about 40-45° C. at about one bar-a. Table J lists aspects of the fatty acid profile of the initial refined sunflower oil prior to hydrogenation and that of the conventionally hydrogenated and the low-temperature hydrogenated oil.

TABLE J

| Component | wt. % at T = 0 min. | Conventional Hydrogenation | Low-Temperature Hydrogenation |
|---|---|---|---|
| C18 | 4.1 | 5.1 | 6.1 |
| C18:1 total | 27.9 | 45.9 | 34.5 |
| C18:2 total | 60.4 | 41.6 | 51.7 |
| C18:3 total | 0.1 | 0.0 | 0.0 |
| Total trans-C18:y fatty acids | 0.5 | 11.2 | 4.8 |
| Total cis-C18:y fatty acids | | 76.3 | 81.4 |
| CFA:TFA | | 6.8 | 17.0 |
| C18:TFA | | 0.46 | 1.3 |

The resultant hydrogenated oil was pourable and semi-liquid at about 25° C. This data suggests that the low-temperature hydrogenated sunflower oil in accordance with an embodiment of the invention is superior to the conventionally hydrogenated sunflower oil, having a TFA content of less than half that of the conventional product. The CFA:TFA ratio of the conventionally hydrogenated sample is under seven and that of the low-temperature hydrogenated sample is more than twice as high at about 17.0. The conventional product's C18:TFA ratio is under 0.5 while that of the low-temperature hydrogenated sample, which has a C18:TFA ratio over 1.2.

Hydrogenation Example K—High-Oleic Sunflower Oil

Each of two samples of a refined, high-oleic sunflower oil was charged into an autoclave. One of the samples was hydrogenated in a conventional fashion and the other was hydrogenated at a lower temperature, both generally as described in Hydrogenation Example I. Table K lists aspects of the fatty acid profile of the initial refined, high-oleic sunflower oil and that of the conventionally hydrogenated and the low-temperature hydrogenated oils.

TABLE K

| Component | wt. % at T = 0 min. | Conventional Hydrogenation | Low-Temperature Hydrogenation |
|---|---|---|---|
| C18 | 3.5 | 4.1 | 6.7 |
| C18:1 total | 81.0 | 82.9 | 81.1 |
| C18:2 total | 10.1 | 7.0 | 7.1 |
| C18:3 total | 0.1 | 0.0 | 0.0 |
| Total trans-C18:y fatty acids | 0.1 | 4.4 | 2.0 |
| Total cis-C18:y fatty acids | | 85.5 | 86.2 |
| CFA:TFA | | 19.4 | 43.1 |
| C18:TFA | | 0.93 | 3.4 |

The resultant hydrogenated oils were pourable and semi-liquid at about 25° C. This data suggests that the low-temperature hydrogenated oil is superior to the conventionally hydrogenated sunflower oil, having a TFA content of less than half that of the conventional product. The CFA:TFA ratio of the conventionally hydrogenated sample is under twenty and that of the low-temperature hydrogenated sample is more than twice that at 43.1. The conventional product's C18:TFA ratio is under 1.0 while that of the low-temperature hydrogenated sample has a C18:TFA ratio over 3.

Hydrogenation Example L—Palmolein

One sample of a refined palmolein was charged into an autoclaves and hydrogenated in a conventional fashion as outlined in Hydrogenation Example I. A second sample of the same refined palmolein was hydrogenated in a separate autoclave in a low-temperature hydrogenation process similar to that described in Hydrogenation Example I. Aspects of the initial palmolein and each of the partially hydrogenated products are listed in Table L:

TABLE L

| Component | wt. % at T = 0 min. | Conventional Hydrogenation | Low-Temperature Hydrogenation |
|---|---|---|---|
| C18 | 4.1 | 6.8 | 8.8 |
| C18:1 total | 41.9 | 51.4 | 43.0 |
| C18:2 total | 10.1 | 0.4 | 5.6 |
| C18:3 total | 0.2 | 0.0 | 0.0 |
| Total trans-C18:y fatty acids | 0.7 | 13.2 | 3.3 |
| Total cis-C18:y fatty acids | | 38.6 | 45.3 |
| CFA:TFA | | 2.9 | 13.7 |
| C18:TFA | | 0.52 | 2.7 |

Although both of the partially hydrogenated palmolein samples were pourable and semi-liquid at about 25° C., the low-temperature hydrogenated sample had a much lower TFA content (3.3 wt. % vs. 13.2 wt. %) and much higher CFA:TFA ratio (13.7 vs. less than three) and C18:TFA ratio (2.7 vs. about 0.5). Hence, it appears that the low-temperature hydrogenation has better trans selectivity and yields a more healthful product than conventional hydrogenation.

Hydrogenation Example M—Corn Oil

Two samples of refined corn oil were treated as outlined in Hydrogenation Example I. Both the conventionally hydrogenated sample and the low-temperature hydrogenated sample were pourable and semi-liquid at about 25° C. Aspects of the initial corn oil and each of the two partially hydrogenated samples are listed in Table M:

TABLE M

| Component | wt. % at T = 0 min. | Conventional Hydrogenation | Low-Temperature Hydrogenation |
|---|---|---|---|
| C18 | 2.0 | 2.3 | 3.4 |
| C18:1 total | 30.9 | 41.6 | 37.4 |
| C18:2 total | 54.4 | 42.5 | 46.2 |
| C18:3 total | 1.0 | 0.6 | 0.8 |
| Total trans-C18:y fatty acids | 0.5 | 7.9 | 3.5 |
| Total cis-C18:y fatty acids | | 76.8 | 80.9 |
| CFA:TFA | | 9.7 | 23 |
| C18:TFA | | 0.29 | 0.97 |

Again, the low-temperature hydrogenated sample was superior to the conventional product in several respects. First, the low-temperature sample had a TFA content less than half that of the conventional sample (3.5 wt. % vs. 7.9 wt. %). Second, the low-temperature sample had a CFA:TFA ratio more than twice that of the conventional sample (23 vs. 9.7). Third, the C18:TFA ratio of the low-temperature sample was more than three times that of the conventional sample (0.97 vs. 0.29).

These examples suggest that aspects of the low-temperature hydrogenation processes outlined above can be used beneficially for a variety of products. In the context of edible fat products, for example, embodiments of the invention provide products that often have trans-fatty acid contents less than half, e.g., one third to one seventh, that of a more conventional process. In addition, the ratio of cis- to trans-C18:y acids in embodiments of the invention are often at least about double the same ratio for a more conventionally processed product. Both of these factors suggest that embodiments of the invention have a better trans selectivity than conventional processes. Further embodiments of the invention also yield partially hydrogenated edible fat products having a ratio of saturated C18 to trans-fatty acids at least about double, and commonly 3-5 times, that of analogous conventionally hydrogenated products.

Edible fats and oils prepared in accordance with the present invention can be utilized in any applications where liquid and semi-liquid fats and oils are currently utilized, e.g., in frying oils, spray oils, bakery, confectionary, spreads, margarines, dressings, soups, ice cream, cheeses, other dairy, baking, and the like. These applications are well known in the art and often involve the modification of the oils of the present invention by blending with other fats, oils, flavors, emulsifiers, texturizers, and the like. These various formulations are well know by the skilled artisan. The following examples are intended to demonstrate the use of the products of the present invention. They are illustrative and not intended to limit the scope of the invention in any way.

TABLE 1

Cake margarine composition

|  | Composition (%) |
|---|---|
| FAT PHASE | |
| Product of Hydrogenation Example I | ~55 |
| Oil blend (e.g., palm-based) | ~25 |
| Lecithin | 0.1 |
| Mono-di glycerides (emulsifier) | 0.1 |
| Beta-carotene | 0.002 |
| WATER PHASE | |
| Water | 17.38 |
| NaCl | 1.00 |
| Skimmed milk Powder | 1.10 |
| K-sorbate | 0.073 |

The fat phase was blended in a buffer tank connected to an Armfield surface-scraped heat exchanger (SSHE). The water phase of the margarine was blended and heated until a temperature of 60° C. was achieved, after which the pH was buffered with citric acid at pH=4-4.5.

After buffering the water phase, it was added to the fat phase, which was stirred by an overhead stirrer at the highest velocity or rpm possible to achieve a pre-emulsion of water in fat. The temperature of the buffer tank was set at 60° C.

The Armfield SSHE conformation was set at AACB and was used with the following settings:

|  | Settings |
|---|---|
| Pump (%) | 51.3 |
| Pressure (bar) | 8.56 |
| A-unit (rpm) | 544 |
| B-unit (rpm) | 72 |
| Set T-out (° C.) | 5.0 |

After stabilization, samples were taken to assess the impact of re-crystallization and the check whether there was post-hardening. No appreciable post-hardening was observed. Some of the samples were put in a cupboard at ambient temperature and others were placed in a refrigerator at 5° C. After 1 week there were no visible differences. After almost 4 weeks the margarines in the refrigerator and ambient temperature still appeared unchanged. Similar processes can used to prepare pastry, tub, baking, or general purpose margarines. Instead of the water-in-oil emulsion detailed above, oil and water emulsions such as low fat spreads or dressings can be prepared by standard procedures.

TABLE 2

Low fat spread (oil-in water-emulsion)

|  | Composition (%) |
|---|---|
| FAT PHASE | |
| Product of Hydrogenation Example I | <20 |
| Fat soluble vitamin A, D/D2/D3 Vitamin E is present as alpha tocopherolin refined oils | (optional) |
| Fat soluble Flavors | |
| Mono-di glycerides (emulsifier) | (optional) |
| WATER PHASE | |
| Water | >50 |
| NaCl | 1-1.5 |
| Dairy/vegetable protein | 3-8 |
| Preservative (K-sorbate) | Approx 0.073 |
| Thickening agent: gelatin, starch, gums, pectins, carrageenan etc | |
| Water soluble flavors | |
| Water soluble vitamin B2, B6, C | (optional) |
| Fermentation culture or chemical pH adjustment | |
| Sugar (whey-powder or glucose, fructose etc) | (optional for fermentation and taste) |

Lab-Scale Processing

Water is heated in a Stephan pan/mixer to a temperature of 60-70 C and the proteins, salt, and/or sugars are added. The water phase is mixed until all components are dissolved and a first portion of the fat phase is mixed in. To decrease the oil droplet size, an ultra-turrax is used. Next, the above mix is processed with a homogeniser (e.g., a Niro homogeniser). After the homogenizing process, the mix is fermented with a culture for at least 12 hours or is acidified with an acid cocktail (lactic acid and/or citric acid, etc.), as known in the art.

After fermentation or chemical acidification, the product is warmed to 80° C. and mixed (pasteurization) in a Stephan pan. The remainder of the fat phase is added to the premix. The thickening agents are added and mixed. After 8 minutes at 80° C., the thick mixture is again homogenized and filled in tubs for evaluation.

TABLE 3

Chocolate Spread

|  | Composition (%) |
|---|---|
| Product of Ex. I | 27.3 |
| Hazelnut paste | 12 |
| Sugar | 39.3 |
| LF cacao powder | 5.8 |
| Skim milk powder | 10.0 |
| Lactose | 5.0 |
| Lecithin | 0.5 |
| Flavors (Optional) | Variable |

All the components are mixed together at 25-30 C and then ground, e.g., ball-milled, for 4 hours at 60° C. After an acceptable particle size is reached, the milling is stopped and the product is filled into tubs. The product may be left at ambient temperature or cooled more quickly, as desired.

Ice Cream—One exemplary ice cream can be prepared according to standard processes by using the following recipe.

TABLE 4

Ice Cream

| | Composition (%) |
|---|---|
| Fat blend | 10.0 |
| Milk solids-non-Fat | 12.0 |
| Sucrose | 10.0 |
| Glucose | 4.0 |
| Stabilizer | 0.2 |
| Emulsifier | 0.2 |
| Water phase | 63.6 |

The fat blend in this example may comprise a partially hydrogenated fat in accordance with embodiments described above or a blend of such a fat, e.g., a partially hydrogenated rapeseed oil, with one or more other fats to optimize product qualities and processing parameters. Flavors and colors may be added as needed.

Similarly, a cream filling for bakery product can be prepared using standard processes well know in the art such as crystallization using a surface scraped heat exchanger and air incorporation. The following formula is illustrative.

TABLE 5

Bakery Cream Filling

| | Composition (%) |
|---|---|
| Crystal sugar (finely grind) | ±60-70 |
| Fat blend | ±30 |
| Cacao powder (defatted), optional | ±10 |
| Lecithin | 0-0.5 |
| Vanilline | 0-0.1 |
| Incorporated air | Approx. 50% of the creme |

As in the preceding example, the fat blend may comprise a partially hydrogenated fat or a blend of such a fat, e.g., a partially hydrogenated rapeseed oil, with one or more other fats.

In addition, products of the present invention can be used in the preparation of other oil products though modification such as interesterification, the preparation of mono or di-glycerides, or in any manner that traditionally hydrogenated fats and oils are used.

The above-detailed embodiments and examples are intended to be illustrative, not exhaustive, and those skilled in the art will recognize that various equivalent modifications are possible within the scope of the invention. For example, whereas steps are presented in a given order, alternative embodiments may perform steps in a different order. The various embodiments described herein can be combined to provide further embodiments.

In general, the terms used in the following claims should not be construed to limit the invention to the specific embodiments disclosed in the specification unless the preceding description explicitly defines such terms. The inventors reserve the right to add additional claims after filing the application to pursue additional claim forms for other aspects of the invention.

The invention claimed is:

1. A method of hydrogenating an unsaturated feedstock, comprising:
   producing a catalyst composition by heating a nickel-based catalyst to a first temperature of at least about 85° C. in the presence of a process gas and a protective non-gas medium; and, thereafter,
   contacting the unsaturated feedstock with the catalyst composition and hydrogenating the unsaturated feedstock by sustaining a hydrogenation reaction at a second temperature of no greater than about 70° C., the feedstock comprising at least one unsaturated organic component.

2. A substantially platinum-free hydrogenation catalyst composition comprising:
   a protective non-gas medium; and
   a nickel-based catalyst dispersed in the protective non-gas medium, wherein the nickel-based catalyst being prepared at a first temperature of at least about 85° C. and being adapted to sustain, at a second temperature of about 70° C. or less and in the presence of hydrogen, a hydrogenation reaction of a dielectric oil comprising polyunsaturated fatty acids.

3. A partially hydrogenated sunflower oil formed from a sunflower oil having a C18:1 content of less than 77 weight percent prior to hydrogenation, wherein the partially hydrogenated sunflower oil:
   is no more solid than semi-liquid at about 25° C.;
   has a ratio of cis- to trans-forms of C18:1, C18:2 and C18:3 fatty acids (CFA:TFA) of at least about 15;
   has a ratio of C18 to trans-forms of C18:1, C18:2 and C18:3 fatty acids (C18:TFA) of at least about 1.2; and
   an induction period at 120° C. of at least about 5 hours.

4. A partially hydrogenated sunflower oil that:
   is no more solid than semi-liquid at about 25° C.;
   has a ratio of cis- to trans-forms of C18:1, C18:2 and C18:3 fatty acids (CFA:TFA) of at least about 25;
   has a ratio of C18 to trans-forms of C18:1, C18:2 and C18:3 fatty acids (C18:TFA) of at least about 1.5; and
   an induction period at 120° C. of at least about 10 hours.

5. A partially hydrogenated palmolein fat that:
   is no more solid than semi-liquid at about 25° C.;
   has a C18:2 content of no greater than about 7 weight percent;
   has a trans-fatty acid content of no more than about 6 weight percent; and
   has a ratio of cis- to trans-forms of C18:1, C18:2 and C18:3 fatty acids (CFA:TFA) of at least about 6.

6. A partially hydrogenated corn oil that:
   is no more solid than semi-liquid at about 25° C.;
   has a C18:2 content of no greater than about 50 weight percent;
   has a trans-fatty acid content of no more than about 6 weight percent; and
   has a ratio of cis- to trans-forms of C18:1, C18:2 and C18:3 fatty acids (CFA:TFA) of at least about 15.

7. A food product comprising an emulsion of water and the partially hydrogenated sunflower oil of claim 3.

8. The food product of claim 7 further comprising lecithin.

9. A margarine composition comprising water and the partially hydrogenated sunflower oil of claim 3.

10. An ice cream composition comprising water and the partially hydrogenated sunflower oil of claim 3.

11. A food product comprising sugar and the partially hydrogenated sunflower oil of claim 3.

12. The partially hydrogenated sunflower oil of claim 3 wherein the CFA:TFA ratio is at least about 18.

13. The partially hydrogenated sunflower oil of claim 3 wherein the CFA:TFA ratio is no greater than about 75.

14. The partially hydrogenated sunflower oil of claim 3 wherein the CFA:TFA ratio is no greater than about 50.

15. The partially hydrogenated sunflower oil of claim 3 wherein the C18:TFA ratio is at least about 1.5.

16. The partially hydrogenated sunflower oil of claim 3 wherein the C18:TFA ratio is at least about 2.

17. The partially hydrogenated sunflower oil of claim 3, wherein the sunflower oil is formed from a sunflower oil having a C18:1 content of less than about 60 weight percent prior to hydrogenation, and wherein the partially hydrogenated sunflower oil has an induction period at 120° C. of at least about 8 hours.

18. The partially hydrogenated sunflower oil of claim 4 wherein the CFA:TFA ratio is at least about 40.

19. The partially hydrogenated sunflower oil of claim 4 wherein the C18:TFA ratio is at least about 2.0.

20. The partially hydrogenated sunflower oil of claim 4 wherein the C18:TFA ratio is at least about 3.0.

21. The partially hydrogenated sunflower oil of claim 4 wherein the C18:TFA ratio is no greater than about 6.0.

* * * * *